US007676493B2

(12) United States Patent
Pizzo et al.

(10) Patent No.: US 7,676,493 B2
(45) Date of Patent: Mar. 9, 2010

(54) INCREMENTAL APPROACH TO AN OBJECT-RELATIONAL SOLUTION

(75) Inventors: Michael J. Pizzo, Bellevue, WA (US); Chris A. Suver, Seattle, WA (US); Pablo Castro, Bellevue, WA (US); Alyssa Heather Henry, Sammamish, WA (US); Andrew J. Conrad, Sammamish, WA (US); Subramanian Muralidhar, Bellevue, WA (US); Benjamin Albahari, Seattle, WA (US); Jose A. Blakeley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 135 days.

(21) Appl. No.: 11/364,060

(22) Filed: Feb. 28, 2006

(65) Prior Publication Data

US 2007/0055692 A1 Mar. 8, 2007

Related U.S. Application Data

(60) Provisional application No. 60/714,639, filed on Sep. 7, 2005.

(51) Int. Cl.
*G06F 7/00* (2006.01)
*G06F 17/00* (2006.01)

(52) U.S. Cl. .............................. 707/103 R; 707/E17.005
(58) Field of Classification Search ................ 707/103, 707/E17.005
See application file for complete search history.

(56) References Cited

U.S. PATENT DOCUMENTS

| 5,449,293 | A | 9/1995 | Chang et al. |
| 5,576,954 | A | 11/1996 | Driscoll |
| 5,717,913 | A | 2/1998 | Driscoll |
| 5,724,575 | A * | 3/1998 | Hoover et al. .................. 707/10 |
| 5,995,969 | A | 11/1999 | Lee et al. |
| 6,128,624 | A | 10/2000 | Papierniak et al. |
| 6,175,837 | B1 * | 1/2001 | Sharma et al. ........... 707/103 Y |
| 6,341,277 | B1 | 1/2002 | Coden et al. |
| 6,341,289 | B1 | 1/2002 | Burroughs et al. |
| 6,556,983 | B1 | 4/2003 | Altschuler et al. |

(Continued)

FOREIGN PATENT DOCUMENTS

EP   1 457 907 A   9/2004

(Continued)

OTHER PUBLICATIONS

Chen et al, "Turning Relational DBMS into Nested Relational DBMS", 2004.*

(Continued)

*Primary Examiner*—Mohammad Ali
*Assistant Examiner*—Brannon W Smith
(74) *Attorney, Agent, or Firm*—Workman Nydegger

(57) ABSTRACT

The claimed subject matter relates to an architecture that can facilitate an incremental approach to an Object-Relational mapping solution. The architecture can provide a rich data model that is defined at the value layer. The rich data model can expose an interface that conforms with the interfaces exposed by common storage-specific data providers. The architecture can extend common storage-specific data provider to support common command representations, and provide entity services that work in terms of the rich data model as well as object services such as identity management, updating and change tracking.

14 Claims, 11 Drawing Sheets

U.S. PATENT DOCUMENTS

| | | | |
|---|---|---|---|
| 6,591,275 B1 | 7/2003 | Russell et al. | |
| 6,609,133 B2 | 8/2003 | Ng et al. | |
| 6,735,593 B1 | 5/2004 | Williams | |
| 6,836,777 B2 | 12/2004 | Holle | |
| 6,847,980 B1 | 1/2005 | Benitez et al. | |
| 7,054,877 B2 | 5/2006 | Dettinger et al. | |
| 7,058,655 B2 | 6/2006 | Goldberg et al. | |
| 7,062,502 B1 | 6/2006 | Kesler | |
| 7,096,216 B2 | 8/2006 | Anonsen | |
| 7,158,994 B1 | 1/2007 | Smith et al. | |
| 7,162,721 B2 | 1/2007 | Ali et al. | |
| 2001/0047372 A1* | 11/2001 | Gorelik et al. | 707/514 |
| 2002/0107840 A1* | 8/2002 | Rishe | 707/3 |
| 2003/0004964 A1 | 1/2003 | Cameron et al. | |
| 2003/0005019 A1 | 1/2003 | Pabla et al. | |
| 2003/0046266 A1 | 3/2003 | Mullins et al. | |
| 2003/0105732 A1 | 6/2003 | Kagalwala et al. | |
| 2003/0110467 A1* | 6/2003 | Balakrishnan | 717/104 |
| 2003/0131338 A1* | 7/2003 | Georgalas | 717/104 |
| 2003/0200533 A1 | 10/2003 | Roberts et al. | |
| 2003/0217128 A1 | 11/2003 | Yanosy | |
| 2003/0229640 A1 | 12/2003 | Carlson et al. | |
| 2004/0006549 A1 | 1/2004 | Mullins et al. | |
| 2004/0015474 A1 | 1/2004 | Anonsen et al. | |
| 2004/0015487 A1* | 1/2004 | Lin et al. | 707/3 |
| 2004/0015488 A1 | 1/2004 | Anonsen et al. | |
| 2004/0015489 A1 | 1/2004 | Anonsen et al. | |
| 2004/0015509 A1 | 1/2004 | Anonsen et al. | |
| 2004/0015814 A1 | 1/2004 | Trappen et al. | |
| 2004/0205303 A1* | 10/2004 | Naveh et al. | 711/144 |
| 2005/0027675 A1 | 2/2005 | Schmitt et al. | |
| 2005/0027720 A1 | 2/2005 | Schmitt | |
| 2005/0027732 A1* | 2/2005 | Kalima | 707/101 |
| 2005/0044089 A1 | 2/2005 | Wu et al. | |
| 2005/0097108 A1 | 5/2005 | Wang et al. | |
| 2005/0097187 A1* | 5/2005 | Thompson et al. | 709/217 |
| 2005/0138052 A1 | 6/2005 | Zhou et al. | |
| 2005/0149555 A1 | 7/2005 | Wang et al. | |
| 2005/0149907 A1* | 7/2005 | Seitz et al. | 717/108 |
| 2006/0184568 A1* | 8/2006 | Barcia | 707/103 R |
| 2006/0195460 A1* | 8/2006 | Nori et al. | 707/100 |
| 2006/0195476 A1* | 8/2006 | Nori et al. | 707/104.1 |
| 2006/0195477 A1 | 8/2006 | Deem et al. | |
| 2007/0055647 A1* | 3/2007 | Mullins et al. | 707/2 |
| 2007/0266041 A1 | 11/2007 | Beckman et al. | |
| 2009/0024652 A1* | 1/2009 | Thompson et al. | 707/102 |

FOREIGN PATENT DOCUMENTS

| | | |
|---|---|---|
| EP | 001457907 A | 9/2004 |
| WO | 02099702 A | 12/2002 |
| WO | WO 02/099702 A | 12/2002 |
| WO | 2004095312 A | 11/2004 |
| WO | WO 2004095312 A | 11/2004 |
| WO | 2004107205 A | 12/2004 |
| WO | 2004107206 A | 12/2004 |
| WO | WO 2004/107205 A | 12/2004 |

OTHER PUBLICATIONS

CiteSeer, evidence of date for Chen reference, 2004.*
"DB Interface Module User's Guide", 2005, Rogue Wave, Section 7.4 http://www2.roguewave.com/support/docs/sourcepro/edition8/html/dbcoreug/7-4.html.*
Blakely, "Data Access for the Masses through OLE DB", ACM, 1996, pp. 161-172.*
Stocker et al, "Databases: Role and Structure", 1984, Press Syndicate of the University of Cambridge, p. 23.*
Botcher et al, "Automated Data Mapping for Cross Enterprise Data Integration", 2003, International Conference of Enterprise Information Systems (ICEIS 2003).*
Amer-Yahia et al, "A comprehensive Solution to the XML-to-Relational Mapping Problem", 2004, ACM.*
Bernes-Lee, et al. "Uniform Resource Identifiers (URI): Generic Syntax" (Aug. 1998), The Internet Society, 40 pages.
Distibuted Management Task Force DMTF: "CIM Database Model White Paper" CIM Version 2.8, Nov. 3, 2003, pp. 1-56, retrieved from http://web.archive.org/web/20040414223542/www.dmtf.org/standards/ published_documents/DSP0133.pdf, last accessed on Jun. 21, 2006.
Gwyn Cole, et al. "A Guided Tour of the Common Information Model Repository", Jan. 10, 2003, 16 pages, retrieved from http://www.informit.com/articles//printerfriendly.asp?p=30482&rl=1>, last accessed on Jun. 21, 2006.
European Search Report dated Jul. 6, 2006 for European Patent Application Serial No. EP 06 10 1024, 3 pages.
Australian Patent Office Search Report dated Apr. 27, 2007 for Australian Patent Application Serial No. SG 200508626-9, 3 Pages.
European Search Report dated Mar. 21, 2007 for European Patent Application Serial No. EP 06 10 0768, 2 Pages.
Mittal, et al., A Framework for eGovernace Solutions, Sep./Nov. 2004, vol. 48, 17 pages International Business Machines Corporation.
Davis, et al., Understanding Services for Integration Management, Department of Mathematical and Computer Sciences, The University of Tulsa, pp. 84-93, Springer-Verlag Berlin Heidelberg 2004.
Acharya, et al., Discovering and Using Web Services in M-Commerce, SCE Computer Networking, University of Missouri-Kansas City, 2004, pp. 136-151, Springer-Verlag Berlin Heidelberg 2005.
European Search Report dated Apr. 11, 2007 for European Patent Application Serial No. EP 06 10 1151, 2 Pages.
Chen. "The Entity-Relationship Model—Towards a Unified View of Data" ACM Transactions on Database Systems, vol. 1, Issue 1, Mar. 1976, pp. 9-36.
OA Dated Aug. 1, 2008 for U.S. Appl. No. 11/550,574, 30 pages.
OA dated Dec. 10, 2008 for U.S. Appl. No. 11/468,008, 43 pages.
EG OA dated Feb. 11, 2009 for EG Application No. 72/2006, 1 page.
CN OA dated Aug. 15, 2008 for CN Application No. 200610004388. 8, 9 pages.
Ambler, S.; "Mapping Objects to Relational Databases: O/R Mapping In Detail," (31 Pages), (2005).
Svirskas, et al.; "An Approach for Solving Java Object Persistence Issues using RDBMS and other Data Sources," Department of Computer Science, Faculty of Mathematics and Informatics, Vilnius University, (15 Pages), (2001).
"Site Dock: Product Overview," Copyright 2002-2003 William. (2 Pages).
"EdgeXtend Technology Overview," (4 pages), (2005).
"Visual Paradigm for UML Enterprise Edition," (2 pages), (2005).
Ware, et al. "O/R Mapped Object Persistence Is the Boon" (13 pages), (2005).
Bernes-Lee, T., Fielding, R., and Masinter, L. "Uniform Resource Identifiers (URI): Generic Syntax" The Internet Society, Aug. 1998, (40 pages).

* cited by examiner

INCREMENTAL APPROACH TO AN OBJECT-RELATIONAL SOLUTION

CROSS-REFERENCE TO RELATED APPLICATIONS

This application claims the benefit of U.S. Provisional Application Ser. No. 60/714,639, filed Sep. 7, 2005, entitled "INCREMENTAL APPROACH TO AN OBJECT-RELATIONAL SOLUTION". This application also relates to U.S. patent application Ser. No. 11/171,905 entitled "PLATFORM FOR DATA SERVICES ACROSS DISPARATE APPLICATION FRAMEWORKS" and filed Jun. 30, 2005. The entirety of each application is incorporated herein by reference.

BACKGROUND

Virtually all applications—from desktop applications to enterprise applications—access data in some form or fashion. When the data to be accessed resides in memory, the application generally works with the data as strongly typed objects (e.g., an object representing a contact). In contrast, when the data to be accessed comes from a database, an Application Programming Interface (API) for interacting with the data is dramatically different. In the latter case, data is generally exposed as a structured tuple (e.g., a data record representing the results of a query against invoices). A tuple is usually defined as a finite function that maps field names to a certain value. Its purpose is typically to indicate that a certain entity or object consists of certain components and/or has certain properties, but here these components are identified by a unique field name and not by a position, which often leads to a more user-friendly notation.

Traditionally, there has been a fairly large division between how applications work with data in memory and interact with data from a database. Data from a database typically comes in terms of tuples, e.g., records of data, in a streaming fashion that the applications must convert to memory representations that are used within the application. Accordingly, most applications of any size have what is called a data access layer or data abstractions layer, which is essentially an abstraction that provides common services and common data modeling abstractions over the data that comes out of the database. The code within those abstraction layers is generally common and typically performs many of the same functions. Thus, in the object-oriented world, it has become increasingly popular to provide a pre-canned abstraction layer which will in a generic fashion take those tuples of flat relational data and turn them into objects within the object language.

Because APIs can differ depending upon where data resides, a number of "Object-Relational Mapping" products have been introduced which attempt to bridge this gap by mapping objects to relational stores. Due to the nature of this mapping, additional services may be supported over the data, such as a looser coupling between the database schema and the object schema, state management services, and update processing. However, because these services build upon an object API (e.g., at an object layer) as opposed to a relational API, they are tightly bound to the object view of the data. Accordingly, these services are only available when using a separate object API, which typically incurs overhead, for example, in object creation and identity management. Additionally, this object API generally requires that the types being queried have been previously installed on the client machine.

Further, developers accessing a database may be required to write to storage-specific components (e.g., "providers" or sometimes referred to as "data providers", "drivers" or other terms) or rely upon a factory model and generic interfaces or base classes, or a common abstraction layer, in order to work across multiple providers. Even with generic interfaces, base classes, or a common abstraction layer, a developer must deal with command syntax differences across different stores, yet storage-specific providers generally expose native storage-specific query syntax. Therefore, it is often difficult to produce storage-independent code. Moreover, a database application might need a client-side nested relational transformation, yet most relational stores today expose only a non-nested (e.g., "flat") relational model.

In addition, developers may want results returned as typed objects that can contain business logic. As well, when modeling results as business objects, developers often want changes to those business objects to be tracked and later persisted. Furthermore, developers may desire support for current and future operating systems, such as operating systems that bridge disparate types of data representations with metadata.

SUMMARY

The following presents a simplified summary of the claimed subject matter in order to provide a basic understanding of some aspects of the claimed subject matter. This summary is not an extensive overview of the claimed subject matter. It is not intended to identify key/critical elements of the claimed subject matter or to delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can facilitate an incremental approach to an Object-Relational mapping solution. We refer to this solution as "incremental" in that it provides layers of abstraction that expose incrementally richer views of the data starting from the flat relational model (exposed by a store-specific provider interface), a nested relational model (exposed by a mapping provider interface), and a full object model (exposed by object services built on top of the mapping or store-specific providers). In accordance therewith, an Entity Framework can employ a mapping provider, which can expose a common data provider application programming interface (API) over extended storage-specific data providers. The Entity Framework can leverage services that work in terms of a common data model, including the mapping provider, to incrementally build functionality typically found in an Object-Relational layer on top of an existing API (e.g., a relational API or value layer API), rather than providing an entirely new set of components and APIs for working with objects. Services such as client side mapping to rich nested relational schemas, state management, update processing and the like can be added in terms of existing relational API classes. As well, object services can be built on top of these rich services, which can follow a common programming pattern.

By following a common, well-established relational programming pattern, developers can build on existing knowledge rather than learn a new set of APIs for dealing with objects. Building on existing relational data access APIs can allow existing applications to be extended to employ objects, or functionality typically found in an Object-Relational framework, where appropriate instead of requiring the entire application to be rewritten to a new API. Building on existing APIs can also allow developers to leverage existing tools and components.

For example, existing data provider applications can benefit from incremental extensions where and when appropriate. The mapping provider can add client-side mapping over existing data provider connections and can decouple the application from a particular storage schema. The mapping provider can also extend existing flat relational schemas to support rich relational concepts, such as nesting, inheritance, complex types and rich relationships (e.g., association or composition). Additionally, such extensions can be accomplished without requiring changes to the capabilities or schema of the underlying relational store. Moreover, at a higher level data objects can be used to query existing relational schemas or rich mapped schemas, and results can be returned as data objects either through object-level queries or by applying simple object mapping to tuples of results returned from existing data providers.

Developers of new data-aware applications can work with a common set of familiar data provider classes such as a class provided by the store-specific data provider and/or the mapping provider. These classes can connect to, query, or retrieve results in terms of a rich conceptual data model. This rich conceptual data model (e.g., the EDM) can include concepts such as nesting, inheritance, complex types and relationships such as containment and association. The EDM can be mapped to various existing flat relational schemas, without requiring changes or additions to the store schema. The store schema, application schema, and even the type of store can all evolve independently, with the mapping to the store and store schema controlled through application configuration. The developer can have the choice of working entirely in terms of textual queries that return standard data records, entirely in terms of object queries that return strongly typed object results, or in any combination of the two.

In addition, building on existing data access components and patterns can yield a better Object-Relational mapping solution, because this process can leverage programming patterns refined over years of use and customer feedback. At the same time, the existing programming patterns can be enhanced with functionality commonly found only by moving to an entirely early-bound, Object-Relational solution. By exposing the solution in terms of smaller, well defined components, the operation of the system can be more predictable and easier to understand, as well as potentially facilitate better support for development, debugging and the like.

In accordance therewith, the architecture described herein can affect the incremental transition from an existing, storage-specific data provider class to a provider class for executing a canonical query format against a feature-rich mapped EDM version of the schema. In other aspects, the Entity Framework can provide additional classes for working with results mapped to application objects, with services such as identity management and change tracking.

Aspects of the described subject matter can include a definition of a formal conceptual EDM at the value layer. Accordingly, all services provided by the architecture (e.g., schema, query, results . . . ), both at the provider (value) layer and the object layer, can work within the context of a rich common data model (e.g., the EDM). Likewise, the data model can include concepts such as complex types, inheritance, relationships, and the like.

According to another aspect of the claimed subject matter, Object-Relational mapping from objects to relational data can be split into two pieces. The first piece can provide the mapping from the store's relational model (generally flat) to a rich nested relational model. The second piece provides a simple mapping between this rich nested relational model and the Object model. Thus, Object-Relational mapping can be split into, for example, mapping between Schematized Data Objects and a rich Nested Relational model, and mapping between the rich Nested Relational model and a standard Relational schema. By defining this rich mapping at the value layer, the object mapping can be very simple, providing for items such as name mapping, value "hiding", mapping of properties to relationships, and the like. Rich Object-Relational mapping can be supported by having a simple mapping between Object the Nested Relational model, and a rich mapping between the Nested Relational model and the Relational schema.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and the claimed subject matter is intended to include all such aspects and their equivalents. Other advantages and novel features of the claimed subject matter will become apparent from the following detailed description of the claimed subject matter when considered in conjunction with the drawings.

DETAILED DESCRIPTION

Figure 1:
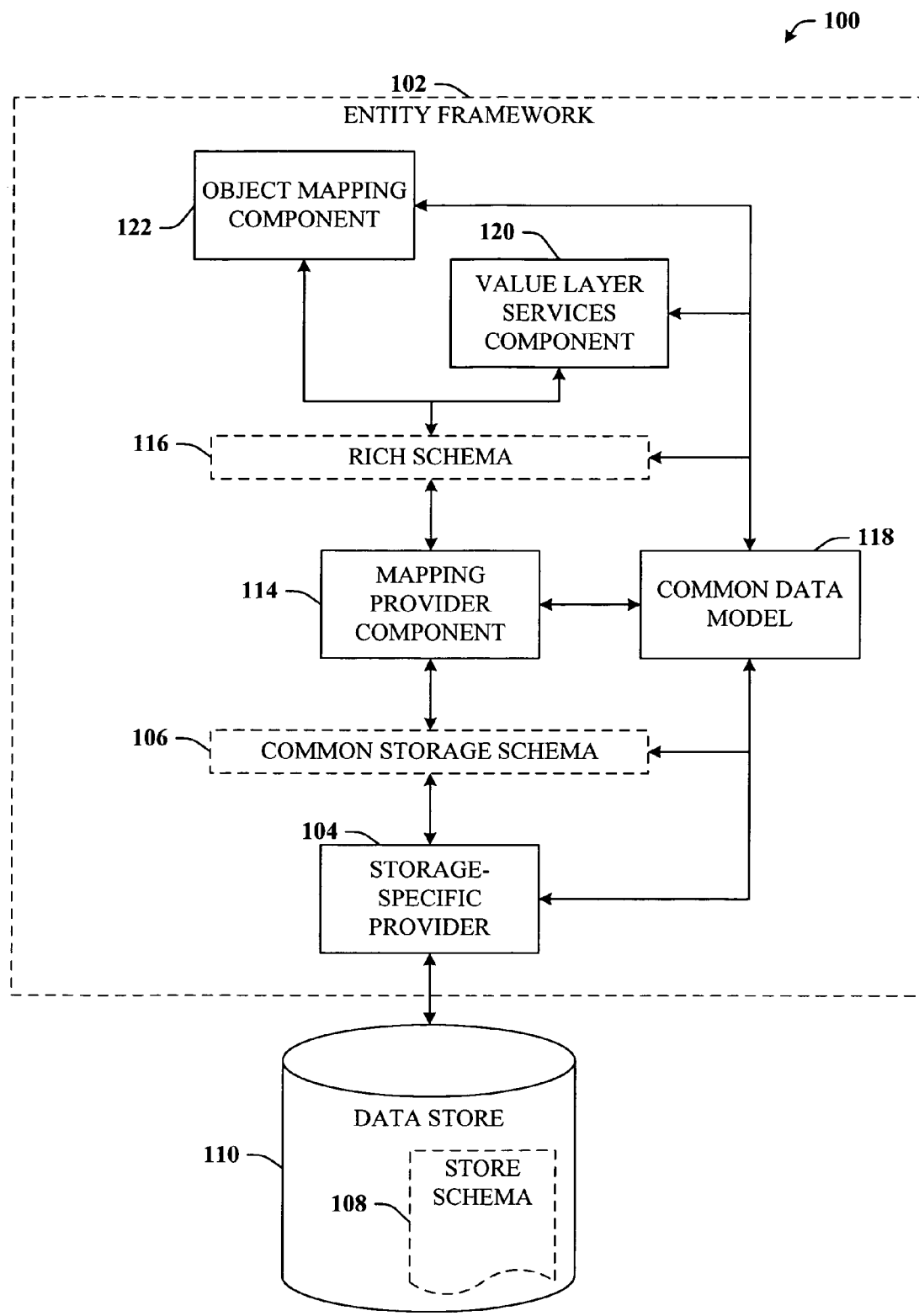
FIG. 1 illustrates a system that can facilitate object-relational mapping with an extended data provider.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter can be practiced without these specific details. In other instances, well-known structures and devices are shown in block diagram form in order to facilitate describing the claimed subject matter.

As used in this application, "rich data model", "Common Data Model", and "Entity Data Model (EDM)" are used interchangeably. As used herein, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to FIG. 1, a computer implemented system 100 that facilitates object-relational mapping is depicted. Generally, the system 100 can include an Entity Framework 102 with a storage-specific provider component 104 that can exposes a common storage schema 106 over a store schema 108 of a data store 110 based on a common data model 118. Further, a mapping provider component 114 that can expose a rich schema 116 over the storage-specific provider component 104 in accordance to the same common data model 118 is also shown. In addition, the Entity Framework 102 can also include a value layer services component 120 that can operate in terms of the common data model 118, and an object mapping component 122 that can provide object services over the rich schema 116.

Accordingly, the Entity Framework 102 can define schema in terms of the common data model 118. The Entity Framework 102 can expose a rich schema 116 at the value layer in terms of the common data model 118 through a mapping provider component 114. Exposing the rich schema 116 at the value layer can provide a number of advantages over defining a framework entirely within an object layer. For example, a common programming pattern in which a developer is already familiar can be employed rather than requiring an application to be rewritten to an object layer Application Programming Interface (API), for which the developer may have little or no knowledge. In addition, defining the rich schema 116 at the value layer can allow a developer to leverage existing tools and components as well as allowing existing code to be migrated incrementally to expand the functionality.

The mapping provider component 114 can be employed to map the common storage schema 106 (which can be exposed by the storage-specific provider component 104) to the rich schema 116. The storage-specific provider component 104 can be a conventional data provider. As discussed in more detail infra, the storage-specific provider component 104 can be extended to support a common command (e.g., query) representation. A data provider (e.g., storage-specific provider component 104) can be defined as comprising four primary objects: a connection, a command, a result object and a change processing object. The storage-specific provider component 104 can interact with and/or expose a store schema 108 of a data store 110 as common schema 106 in terms of the common data model 118. For example, the storage-specific provider component 104 can have an object which represents a connection to the data store 110 (e.g., a DbConnection), and using that connection object, a command object can be built up that represents a command to the data store 110 (e.g., a DbCommand). The data store 110 can return results (e.g., results to the query command) that are exposed by the storage-specific provider component 104 in the form of a result object (e.g., a "DataReader") that is typically a stream of tuples. The results can be placed in a cache (e.g., a "DataSet", not shown) provided by the value layer services component 120, and changes made through the cache can be applied to the data store 110 by employing the change processing object (e.g., a "DataAdapter").

As described herein, the claimed subject matter can employ a different approach to object-relational mapping in order to bridge the gap between relational representations and objects. For example, rather than defining a complete new set of classes and components for working with objects against databases (e.g., the data store 110), data provider (e.g., storage-specific provider component 104) connection, command, result, and change processing classes can be extended to work with value layer services component 120, and mapping provider component 114, in the context of a rich common data model 118, such that applications can work with the same services directly at the value layer or at the object layer through the object mapping component 122. Thus, mapping and other components typically found only in object layers can become available at the value layer as well. Conventionally, object-relational solutions are defined at the object layer, and the objects are defined to support a data model that is in some ways richer than the relational model of underlying databases. For instance, relational databases typically have tables, and a user can facilitate joins between the tables. Generally, there are concepts of integrity rules between the tables such as keys that conceptually define a relationship between the tables that is often interesting to model within the classes of the objects of an application. Hence, if a table has records for customers and orders, a relationship can be created in the objects such that, e.g., an order must have a customer.

However, within the relational database, there is no mechanism to utilize implicit relationships between the records (e.g., customers and orders) in querying or in navigation or in many other ways that may be useful to a developer. Thus, in conventional systems, object-relational mapping is a matter of providing an object layer data model that supports concepts of explicit relationships between the classes, such that, e.g., a customer class has a collection of orders, and an order class has a customer. Accordingly, functionality such as navigating and querying the rich data model has typically been available only within an the object layer.

In contrast, Entity Framework 102 can extend the relational data model (e.g., store schema 108) of conventional relational databases (e.g., data store 110) by employing concepts that do not typically exist in relational databases such as inheritance, hierarchy and relationships, specifically composition and association relationships. Therefore, services (e.g., provided by the value layer services component 120) such as a query can be employed against the rich schema 116 or the common storage schema 106 and return results as values (e.g., as tuples) that conform to the common data model 118. Thus, rather than being traditional flat relational results, hierarchical results can be returned, inheritance within the results can be returned, and/or association and composition links can be returned within the results without ever materializing a class representing that data item.

The storage-specific provider classes 104 can continue to exist, and can provide direct, explicit unmapped access to a data store 110. Such a command can contain connection information that typically includes authentication information and the like and can be used to start a local transaction. The command can be explicitly associated with the local transaction and can contain a textual command representation that goes directly against the store schema 108, with no mapping to the rich schema 116 and no parsing and/or query building on the client.

In order to facilitate working with other services, such as the mapping provider component 114, value layer services component 120, and object mapping component 122, storage-specific providers 104 can be enhanced to expose schema information according to the common data model 118 (e.g., common storage schema 106) and consume, for example, an alternate canonical command representation (e.g., a canonical command tree or common entity query syntax) against that common storage schema 106. The extended storage-specific provider 104 need not be expected to expose nested relational views on top of flat relational schemas, or to map objects to and from various schema. Rather, the storage-specific provider 104 can simply expose a common view (e.g., common schema 106), command language, and result format over the existing store schema 108, and the mapping provider component 114 can map this to the rich schema 116.

The next layer above the storage-specific provider component 104 can be the mapping provider component 114, which itself can be exposed as a standard data provider, so it has a connection, a command, a result object and a change processing object. A difference is that the mapping provider component 114 also can support advanced common data model 118 concepts (e.g., identity complex properties, nesting, polymorphism, relationships, and so on) on top of existing relational data providers and/or storage-specific data providers 104. Therefore, the mapping provider component 114 can support inheritance, hierarchy, relationships such as associations and compositions, and richer types including names, types and identities within the types, and the mapping provider component 114 can support these concepts over existing relational schemas such as store schema 108 by way of e.g., client side mapping.

As detailed supra, the mapping provider component 114 can map the storage-specific provider component 104 to the common data model 118 and expose the common data model 118 as a data provider (e.g., expose a connection, a command a result object and a change processing object) that can in turn be exposed as objects through object mapping component 122 to the application consuming the entity framework 102. In accordance with an aspect of the claimed subject matter, the entity framework 102 can be implemented as a managed API. The entity framework 102 need not have any hard dependencies on proprietary tools—that is, it can be installed and used over common development environment. However, the entity framework 102 can be implemented with certain tools in mind, and can, for example, leverage features such as language integration, extension methods defined outside of the classes, and the like where available. Moreover, the entity framework 102 need not rely on new language features, such as language-integrated queries or data interfaces. Yet, the entity framework 102 can be implemented with such features in mind with the intention of supporting these language innovations. Furthermore, the entity framework 102 can define lower level, explicit API classes suitable for particular packages. As well, certain object types may interact with the system through higher-level abstractions, such as, for example, "My*" classes exposed by common programming languages.

The entity framework 102 can also include an object mapping component 122. The object mapping component 102 can provide support for binding to results as application objects. Specifically, an ObjectContext (not shown) can provide support for identity management, state management, updating objects, and the like. In addition, a typed canonical command builder (not shown) can provide strongly typed query building and can implement queries (e.g., ObjectCommand<T>) for language integration. Results can then be returned as a typed enumerator (e.g., IEnumerator<T>).

According to an aspect, the entity framework 102 can be implemented in a 1-tier or 2-tier manner, where connections and state may be maintained between method calls. Typically applications deploy the API Runtime components on a middle tier, or on a "smart" client tier with explicit synchronization of data to a local store. As well, some classes within the entity framework 102 can be specific to a data store 110, while other classes can be common across stores. Functionality that is specific to a store can be implemented in provider classes (e.g., storage-specific provider 104). Common functionality such as client mapping, object query language parsing, object materialization, and the like can be factored out into common runtime classes (e.g., mapping provider component 114, value layer services component 120, and object mapping component 122).

It is to be understood that the entity framework 102 can support working with data as structured types as well as objects by way of the object mapping component 122. Whether a developer desires to access data through objects or structured types need not require a completely different programming model. The same developer working against the same mapped schema may generally query in terms of classes, but occasionally is required to return results as structured types, e.g., when formulating reports that rely on projections or aggregations over the data.

In accordance therewith, the entity framework 102 can provide support for many of the following: values as well as objects; a degree of penetrability between layers; explicit mapping support; separate object mapping and store mapping; extensions to existing data provider models; store-specific functionality pushed to providers; and common functionality built on top of providers.

Figure 2:
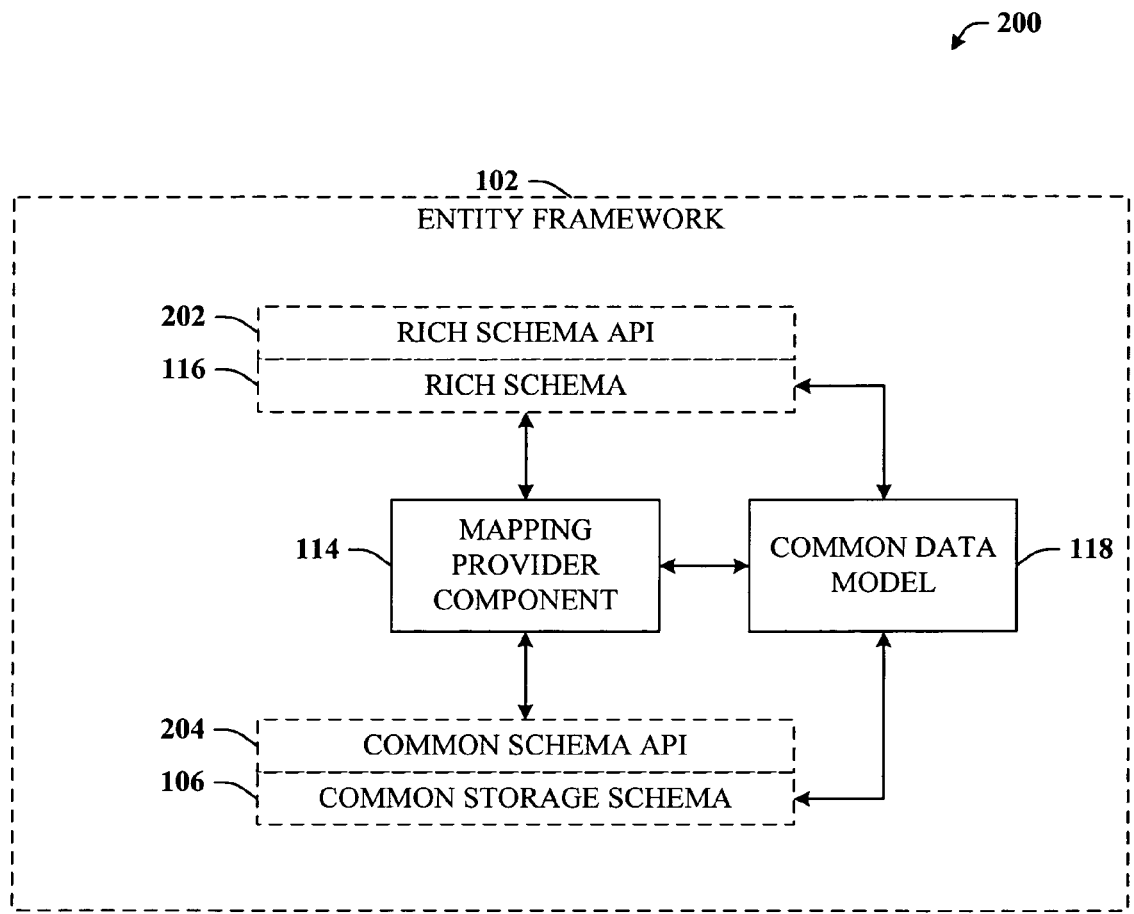
FIG. 2 illustrates a block diagram of a mapping component that can expose one or more data providers as an Entity Data Model (EDM), the EDM is a data provider.

Turning now to FIG. 2, a system 200 that facilitates object-relational mapping is shown. As depicted, the Entity Framework 102 can enhance the value layer space. In particular, the common data model 118 can provide a common entry point for applications coding against multiple back-ends, including nested relational mapping and a canonical object query language over one or more data providers. As described supra, the rich schema 116 can be implemented by building the mapping provider component 114 on top of an existing data provider (not shown). The mapping provider component 114 can expose the rich schema 116 as a data provider. For example, mapping provider component 114 can expose a rich schema API 202 that can have, e.g., a connection, a command, and it can return the results of a result object and support updating through a change processing object. Accordingly, the mapping provider component 114 can expose an interface similar to the common schema API 204 that conventional data providers expose, so there is no need to go to the object layer. Moreover, the existing programming model can also be exposed, which is useful in a number of different ways.

First, there has grown a community, a set of tools, knowledge, and/or products around existing data providers and that knowledge can be leveraged rather than forcing people to learn new interfaces. Secondly, once the common data model 118 is defined over existing relational stores 110, then object services, such as object materialization, identity management and change tracking can be incrementally built on top of those existing common data model 118 extensions. Hence, developers are able to code against a common rich conceptual data model whether they are using objects or values and have the same services and the same richness of expression in both cases. Additionally, this incremental approach can provide the ability to take existing code and migrate it incrementally to bring on new capability. For example, an existing result object of a storage-specific provider can materialize results as objects or as value records. Similarly, an existing connection to a database can be employed to look at the store schema of a data store in terms objects, in terms of the common data model 118, or in terms of a flat-relational model. Essentially, by componentizing the architecture into individual, well-defined components, each of which incrementally adds functionality to the base that an applications starts with, can provide more flexibility and different programming patterns that a developer can utilize. Further, this approach can enhance the adoption of the overall architecture by allowing developers to incrementally migrate to that architecture, leveraging the knowledge, tools, documentation and background already developed, rather than forcing them to start fresh coding to a new API, a new set of components, running new tools and so forth.

It is to be appreciated that, by exposing the mapping functionality as a standard data provider (e.g., mapping provider 114) and using the same API (e.g., classes or interfaces) that mapping provider 114 uses to communicate with storage-specific provider (not shown), multiple instances of mapping provider 114 could be layered, one on top of the other. Thus, mappings can be composed by layering an instance of a mapping provider 114 with a mapping to one rich schema 116 to another instance of a mapping provider 114 that exposes an alternate rich schema 116, for example. The mapping provider 114 may include special code to optimize cases where one instance of a mapping provider 114 consumes a second instance of a mapping provider 114, or may treat the second instance identically to a storage specific provider (not shown).

It is further to be appreciated that the mapping provider 114 can provide a common entry point for applications writing storage-independent code. The mapping provider 114 can provide a common set of classes that expose a common data model (e.g., common data model 118), command (e.g., query) language, and mapping functionality against any data store. In addition, the mapping provider 114 may include metadata and parsing logic necessary to provide additional client-side functionality against any store, for example the ability to fetch results one page at a time, etc.

Figure 3:
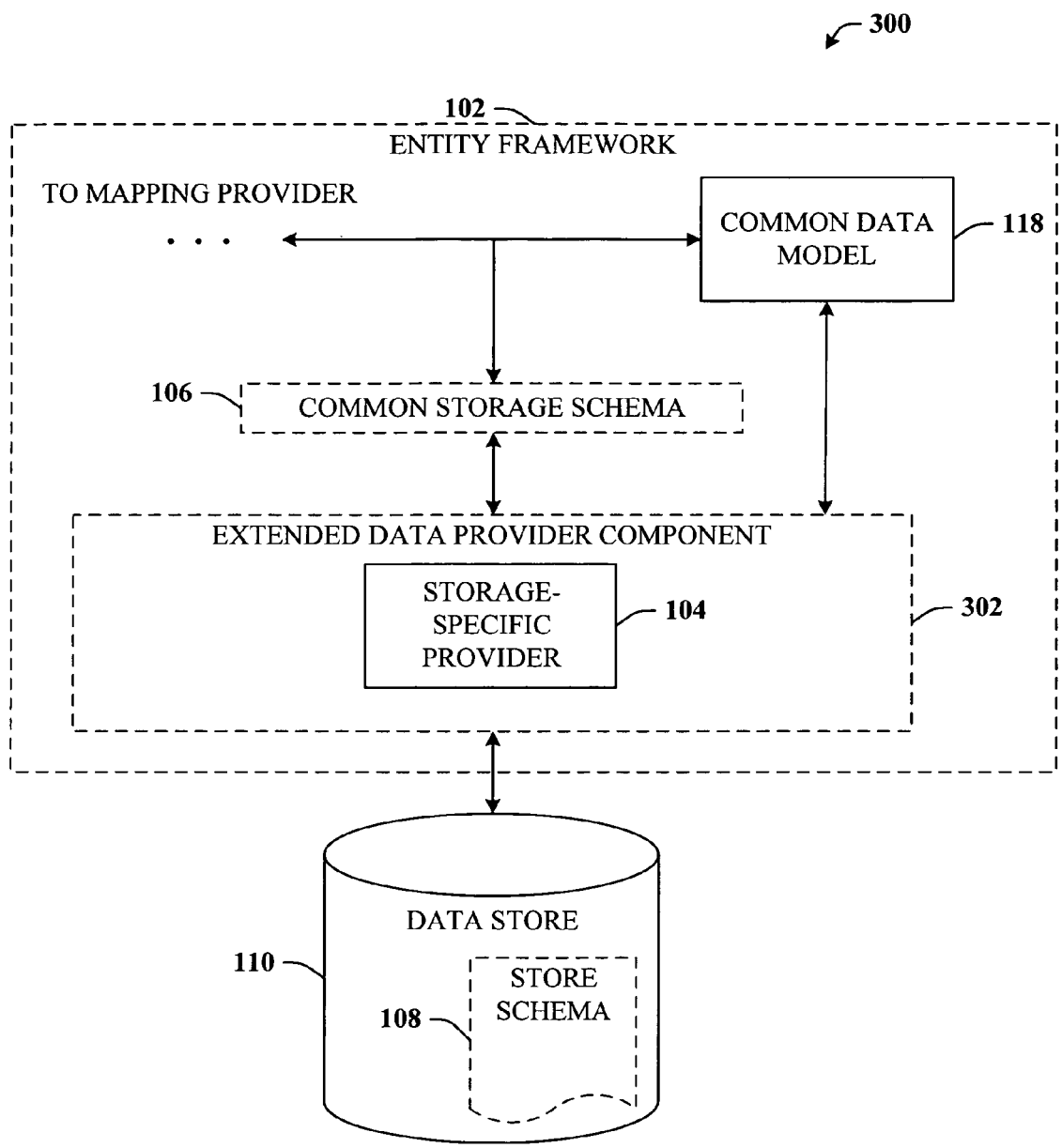
FIG. 3 illustrates an extended data provider that translates a canonical command into native data provider specific code.

Turning briefly to FIG. 3, a system 300 that facilitates object-relational mapping is illustrated. The system 300 generally includes the Entity Framework 102 described in FIGS. 1-2. Additionally, the system 300 can include an extended data provider component 302. As described, a data provider (e.g., storage-specific provider component 104 or extended data provider component 302) typically consists of three primary objects, including a connection, a command, a result object (e.g., a "DataReader") and may include a fourth change processing object (e.g., a "DataAdapter") for interacting with a cache (not shown). Alternatively, the change processing functionality may be subsumed by one of the other provider objects such as the command, or by the cache itself. Generally, the storage-specific provider 104 will differ depending upon the type of data store 110. For example, the data store 110 can be an Oracle-brand database, DB2-brand database, and/or an SQL Server-brand database, etc., and in each case the data provider can differ. Therefore, in accordance with an aspect of the claimed subject matter, the storage-specific provider 104 can be extended (e.g., to create the extended data provider component 302) to provide for the ability to express a command in a store neutral manner.

In order to compose with other components in a data provider-neutral way, the extended data provider component 302 can support a canonical command. A canonical command can be expressed in terms of a common string-based syntax or a canonical command tree that provides common syntax for expressing a command across a variety of different data stores 110. Additionally, the extended data provider component 302 can support compensation for query or other command operators within the canonical command that may not be supported natively within the store 110 (e.g. compensation for a nested query). This compensation may be directly implemented by the storage-specific provider 104, or as a common entity service (e.g., services provided by value layer services component 120 of FIG. 1) implemented on top of the canonical commands of the extended data provider component 302.

Moreover, it should be appreciated that in some cases certain command operators may not be supported by the store 110. In such cases, command compensation can be supplied either by the extended data provider component 302, or a common component (not shown) that implements the compensation functionality, built on top of the canonical command representation of the extended data provider component 302. For example, extended data provider component 302 can, e.g., support nesting by executing multiple queries and combining the results. On the other hand, a common component (not shown) could perform similar operations when, e.g., it is invoked by the mapping provider component 114 (FIG. 1).

It is also to be appreciated that the extension can be affected in various ways. For example, a data provider can be enhanced to comply with the common data model 118 through both the mapping provider component 114 and canonical extensions in the data provider itself. Enhancements may be in existing classes, or in a definition of additional classes that are part of a data provider layer. In some cases, these classes may be implemented in a separate assembly from the extended data provider component 302, but can still be provider-dependent (e.g., in generating back-end specific queries and updates). Accordingly, it should be understood that the target data model for the mapping provider component 114 can be the common data model 118. The common data model 118 may be mapped to relational or other storage schemas through the extended data provider component 302, but a programmer can code against the common data model 118.

Figure 4:
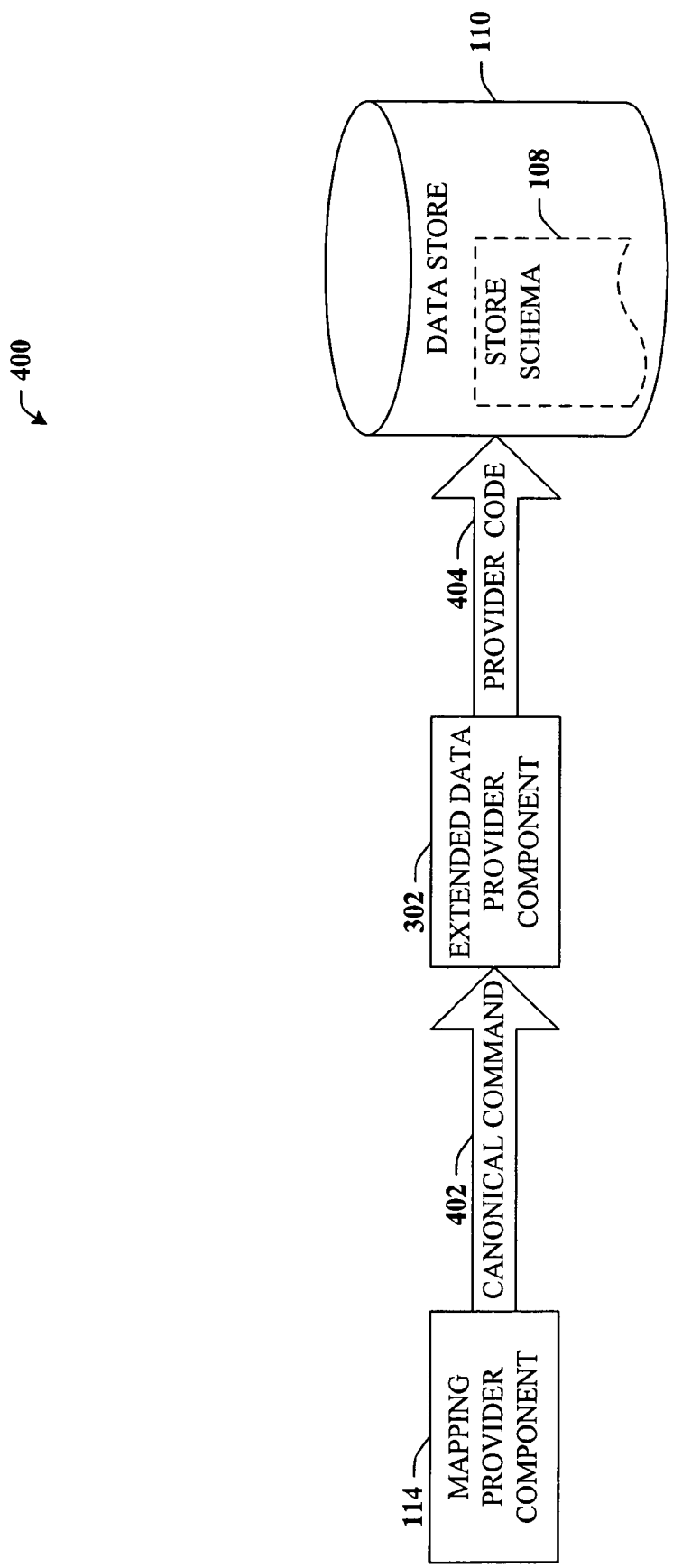
FIG. 4 illustrates a block diagram of a mapping provider that can further include various classes.

With reference to FIG. 4, a system 400 that generally translates generic commands into provider-specific commands is illustrated. The mapping provider component 114 can send a canonical command 402 to the extended data provider component 302. As described supra, the canonical command can provide for common commands to be expressed irrespective of the type of data store 110. The extended data provider component 302 can facilitate translating the canonical command 402 into provider code 404 that is data provider-specific. For example, the extended data provider component 302 can translate the canonical command 402 into, e.g., Transact SQL (T-SQL) commands for use with the data store 110. A number of other aspects will become apparent with reference to the various scenarios described below.

Figure 5:
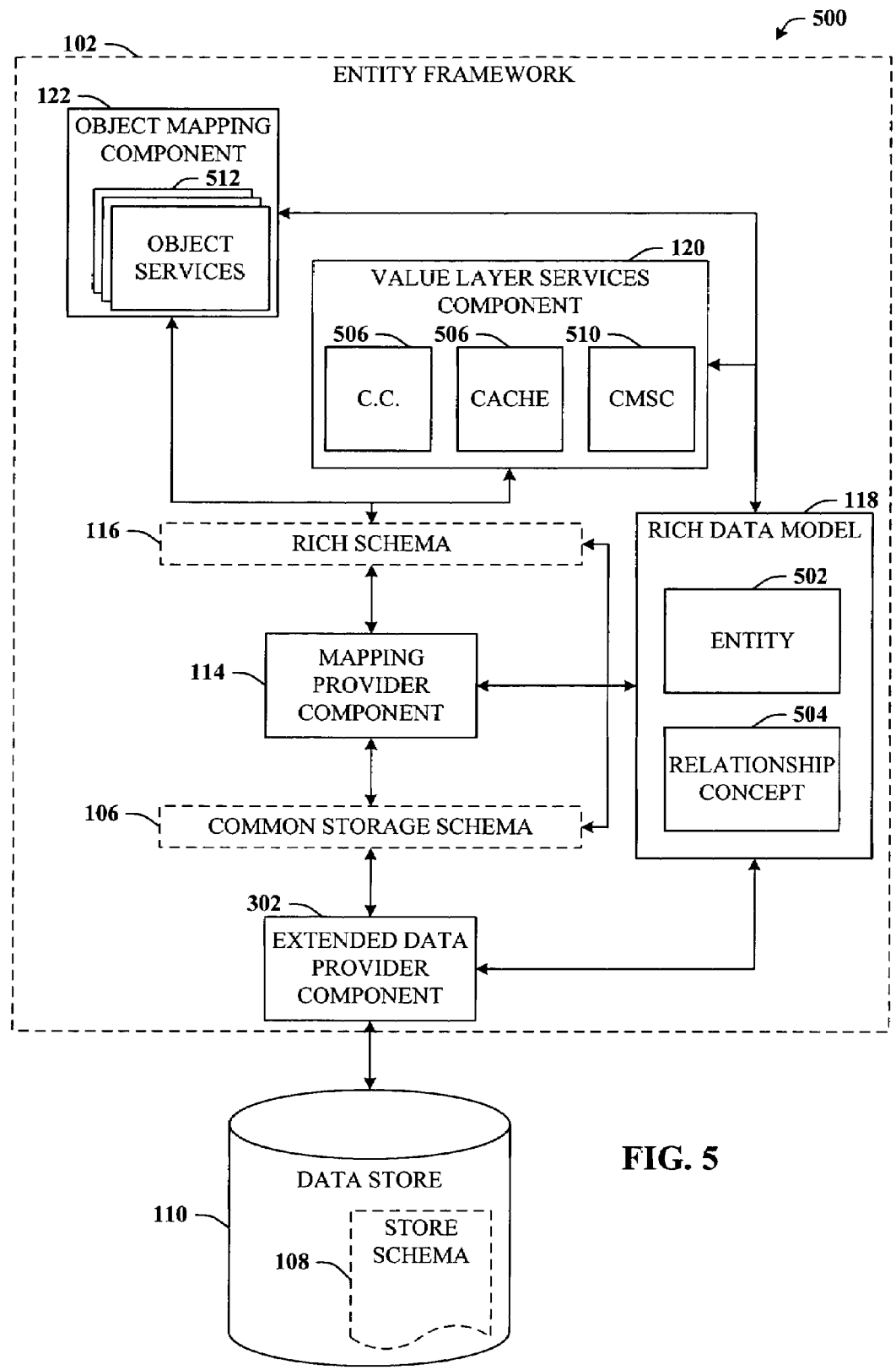
FIG. 5 illustrates the mapping provider that can transform a data store output into a rich nested relational model.

Turning now to FIG. 5, a computer implemented system 500 that facilitates object-relational mapping is depicted. Generally, the system 500 can include an Entity Framework 102 that has been described supra, but depicted here in greater detail. The common data model 118 can include one or more entities 502 that embody concepts not typically found in relational data stores such as data store 110. For example, the entity 502 can be an entity with strong identity, an entity with inheritance, an entity with complex types, an entity with relationships, and so forth. Additionally, the common data model 118 can include one or more relationships 504 (e.g., compositions, associations, association entities, common value or calculated relationships, etc.) that relate entity types. These relationships 504 can define navigation and constraint enforcement between the entity types, for example, and may or may not reflect constructs in the store (e.g., foreign key relationships).

The value layer services component 120, as depicted, can include a common component 506 that can be employed to compensate for command operators intended for the data store 110, but for which the data store 110 does not support (e.g. a command with nested results). As detailed above, the functionality of the common component 506 can additionally or alternatively be built into the canonical commands within the extended data provider 302. The value layer services component 120 can also include a cache 508 that can be employed for entity services such as identity management, change tracking and the like. Additionally, the value layer services component 120 can include a common metadata service component 510 to, for example, support services that require metadata. The object mapping component 122 can include and/or support one or more object services 512, such as object materialization, typed queries, data aggregation, object cache, etc, and can employ API patterns that are substantially identical to the API patterns provided by a storage-specific provider and/or the extended data provider 302.

In one aspect, the common data model 118 can represent rich schema 116 resulting from nested relational mapping over the extended data provider component 302, as well as canonical object queries over the rich schema 116 which are passed through the mapping provider component 114 to the extended data provider component 302. Since the Entity Framework 102, the common data model 118, the extended data provider 302, and/or the mapping provider component 114 can be defined at the value layer, the value layer services component 120 can also be defined at the value layer. As such, the object mapping can be a very simple matter.

The following scenarios describe different valid uses of the aforementioned components.

Direct Access (No Mapping, No Parsing, No Object Creation)

There will always be customers who want to issue commands directly against a store schema 108. Generally those customers want to know that no mapping, parsing, or any other extra processing occurs on the client, and want full control over connections, transaction boundaries, etc. These low-level, explicit programmers can use traditional data provider patterns (e.g., ADO.NET-brand data provider patterns) that can explicitly create and open a connection, specify a command in a provider-specific syntax, and can execute it to get a result of records. Observe the following code:

```
// Create and open an explicit connection
using(SqlConnection conn = new SqlConnection(connectString)) {
    conn.Open( );
    // Create a command
    SqlCommand command = conn.CreateCommand( );
    command.CommandText = "Select cust_id, name from customers";
    // Retrieve results from DataReader
    DbDataReader reader = command.ExecuteReader( );
    while(reader.Read( ))
        Console.WriteLine("Customer ID={0} Name={1}",
            reader.GetString(0),reader.GetString(1));
    // Close reader
    reader.Close( );
}
```

Canonical Commands

Certain providers can support the ability to take a canonical query or DML command in the form of a command tree (e.g., through a SetCommand method, a command tree property, or a command constructor). For example:

```
// Create and open an explicit connection
using(SqlConnection conn = new SqlConnection(connectString)) {
    conn.Open( );
    // Create a command
    SqlCommand command = conn.CreateCommand( );
    // Create a canonical command tree and set on the Command
    command.CommandTree = new QueryCommandTree (
        "SELECT c.cust_id, c.name FROM customers AS c",
        metadata);
    // Retrieve results from DataReader
    DbDataReader reader = command.ExecuteReader( );
    while(reader.Read( ))
        Console.WriteLine("Customer ID={0} Name={1}",
            reader.GetString(0),reader.GetString(1));
    // Close reader
    reader.Close( );
}
```

Alternatively, a canonical command for a particular store may be obtained through other means, such as construction of a storage-specific canonical command object or from a factory method such as might be obtained from the storage-specific connection. This canonical command may support a common command syntax and a common set of operators such as nesting, for example.

```
// Create a canonical command from the provider's factory
DbCommand command =
    conn.ProviderFactory.CreateCanonicalCommand( );
command. CommandText =
    "SELECT c.cust_id, c.name FROM customers AS c";
```

Mapping Provider

A generic data provider can provide a common entry point for working across storage-specific data providers. Data provider connections may be explicitly specified, such as through a constructor or property, or configured through a configuration entry. Because storage providers support a canonical command representation, the mapping provider's command object can expose a common language command syntax that passes a common canonical command representation to the underlying storage provider. Consider the following code segment:

```
// Create a common connection
// Specify storage provider in connection string
using(MapConnection conn = new MapConnection(connectString)) {
    conn.Open( );
    // Create a command
    MapCommand command = conn.CreateCommand( );
    command.CommandText =
        "SELECT c.cust_id, c.name FROM customers AS c";
    // Retrieve results from DataReader
    DbDataReader reader = command.ExecuteReader( );
    while(reader.Read( ))
        Console.WriteLine("Customer ID={0} Name={1}",
            reader.GetString(0),reader.GetString(1));
    // Close reader
    reader.Close( );
}
```

Storage Mapping

The Mapping Provider (e.g., mapping provider component 114) can also provide client-side storage mapping to expose a common schema over possibly disparate and changing storage schemas. This level of indirection is useful for providing a looser coupling between the application logic and storage schema. In addition, this mapping can support exposing a rich nested relational schema over a flat relational schema. The mapping information may be provided explicitly by passing a metadata interface to the Mapping Provider's connection object, or by specifying mapping information as part of the configuration, such as in the following code:

```
// Create a common connection with client-side mapping
using(MapConnection conn =
        new MapConnection(connectString, storeMapping)) {
    conn.Open( );
    // Create a command
    MapCommand command = conn.CreateCommand( );
    command.CommandText =
        "SELECT c.cust_id, c.name FROM customers AS c";
    // Retrieve results from DataReader
    DbDataReader reader = command.ExecuteReader( );
    while(reader.Read( ))
        Console.WriteLine("Customer ID={0} Name={1}",
            reader.GetString(0),reader.GetString(1));
    // Close reader
    reader.Close( );
}
```

Object Materialization

The rich, structured results can easily be mapped directly to schematized data objects with similar structure. The ability to materialize structured records as objects works with properly formed results from any source and gives the developer ultimate control over query formation.

```
// Create a common connection with client-side mapping
using(MapConnection conn =
        new MapConnection(connectString, storeMapping)) {
    conn.Open( );
    // Create a command
    MapCommand command = conn.CreateCommand( );
    command.CommandText =
        "SELECT c.cust_id, c.name FROM customers AS c";
    // Retrieve results from DataReader
    DbDataReader reader = command.ExecuteReader( );
    // Materialize results as objects
    foreach(Customer c in
        ObjectMaterializer.CreateObjects(
            reader, objectMapping))
        Console.WriteLine("Customer ID={0} Name={1}",
            c.ID, c.FullName);
}
```

Object Command

With mapping to a rich data model supported as part of the Entity Framework at the value layer, an object query component can relatively easily query and map rich structural schema to objects. Because the mapping provider exposes the same interface as the storage providers, the object mapping can work over either the mapping provider or a storage-specific provider. Consider the following code segment:

```
// Create a common connection with client-side mapping
using(MapConnection conn =
        new MapConnection(connectString, storeMapping)) {
    conn.Open( );
```

```
    // Create an object command, given connection and mapping
    ObjectCommand customers = new ObjectCommand(
        "SELECT customer FROM Customers AS customer",
        ObjectMapping, conn);
    foreach(Customer customer in customers)
        Console.WriteLine("Customer ID={0} Name={1}",
            customer.ID, customer.FullName);
}
```

Typed Object Command

For languages that support the concept of generics, a typed object command can be returned. The use of generics is shown below, by way of illustration. A typed command can similarly be used in subsequent illustrative examples shown using ObjectCommand. In the case of a typed command, the object mapping may be specified explicitly, through a constructor or property on the typed command, or a default mapping may be generated based on the type specified for the object command, for example, through reflecting on the types members.

```
// Create a common connection with client-side mapping
using(MapConnection conn =
        new MapConnection(connectString, storeMapping)) {
    conn.Open( );
    // Create an object command, given connection
    // Mapping is derived from the specified type (Customer)
    ObjectCommand<Customer> customers =
        new ObjectCommand<Customer>(
            "SELECT customer FROM Customers AS customer",
            conn);
    foreach(Customer customer in customers)
        Console.WriteLine("Customer ID={0}
        Name={1}",
            customer.ID, customer.FullName);
}
```

Object Cache

In order to support identity management and change tracking at the object layer, an object cache can be provided. Query results can be compared to, and merged with, existing results in the cache at the value layer. It is to be appreciated that, although the cache may contain data objects, data providers can work with items in the cache at the value layer, for example, in obtaining original and current values to process changes. In the following illustrative code, a cache is supplied to the query object.

```
// Create a common connection with client-side mapping
using(MapConnection conn =
        new MapConnection(connectString, storeMapping)) {
    conn.Open( );
    // Create an object cache for change and identity management
    ObjectCache cache = new ObjectCache(objectMapping);
    // Create an object command, giving cache
    ObjectCommand customers = new ObjectCommand(
        "SELECT customer FROM Customers AS customer",
        conn, cache);
    // Loop through results as objects and make changes
    foreach(Customer customer in customers)
        customer.Verified = true;
    // Submit changes from cache back to store
    EntityAdapter adapter =
        conn.ProviderFactory.CreateEntityAdapter( );
    adapter.Update(cache);
}
```

Object Graph

For a full strongly typed, Object-Relational experience, a developer may want to retrieve results as a partial object graph that supports demand-loading, identity management, and updating of objects within the graph. The demand loading, change tracking, and identity management can be provided through a higher level class representing the application's data context. This data context class provides a simple entry point that may generate, for example, a map connection and object cache and pass them to an object command. Calling a method on the data context to save changes passes the changes to the underlying provider, for example, by requesting a change processing object from the provider's connection object and passing the changed objects from the cache. For Example:

```
// Create an ObjectContext
ObjectContext context =
    new ObjectContext(connectString, objectMapping);
// Create an object command
ObjectCommand customers = context.CreateCommand(
    "Select customer from Customers as customer");
// Retrieve results & update customers
foreach(Customer customer in customers)
    customer.Verified = true;
// Write changes to store
context.SaveChanges( );
```

Language-Integrated Query

Certain programming languages (e.g., C#-brand) may include language extensions that integrate the building of query expressions into the language. These can be supported by the invention through the typed object command object as shown:

```
// Create a Object Context over SalesData
ObjectContext oc = new ObjectContext("SalesData");
// Query for customers named "Smith"
ObjectCommand<Customer> customers =
    oc.CreateCommand<Customer>("Customers");
var customerQuery = from customer in customers
    where customer.LastName="Smith";
// Iterate through results
foreach(Customer customer in customerQuery)
    Console.WriteLine(customer.FirstName);
```

By using an instance of a typed object context, for example, generated from a particular schema, the programming experience can be even more tightly bound to the language. Consider the following example:

```
// Create an instance of a typed object context
// generated to reflect a schema containing Sales Data
SalesData salesData = new SalesData(connectString);
// Query for customers named "Smith"
var customerQuery = from customer in salesData.Customers
    where customer.LastName="Smith";
// Iterate through results
foreach(Customer customer in customerQuery)
    Console.WriteLine(customer.FirstName);
```

Exemplary class definitions supporting the preceding examples follow. It is to be appreciated that the following class definitions are intended only as an exemplary representation of the invention for the purpose of illustration and not limitation. Other alternate implementations are envisioned to be within the spirit and scope of the claimed subject matter.

Namespaces, High-Level Runtime Classes

By way of example, and in addition to storage-specific provider components, components of the Entity Framework may be separated into, but not limited to, the following namespaces:

```
System.Data
    DataSet
System.Data.Common
    Common Provider Base Classes
System.Data.Mapping
    Mapping Provider
System.Data.Objects
    ObjectCommand
    ObjectCommand<T>
    ObjectCache
    ObjectContext
    ObjectMaterializer
System.Data.CommandTree
    Canonical Command Trees
System.Data.Metadata
    Common metadata interfaces and classes
```

Store-Specific Provider Classes

The following classes can be implemented for each store; for example, each provider can have its own named versions of these classes (for example, SqlConnection, SqlCommand, SqDataReader, SqlDataAdapter). The classes can exist in different namespaces according to the individual provider (for example, System.Data.SqlClient for the Microsoft SqlServer-specific storage provider).

DbConnection

A DbConnection can serve as a connection to the store. From a DbConnection, applications and services may be able to obtain a ProviderFactory to get to other storage-specific provider objects, for example a data adapter or canonical command object. An abbreviated example of a DbConnection is shown below.

```
public abstract class DbConnection {
    //Constructor
    protected DbConnection( );
    // Properties
    public String ConnectionString {get; set;}
    public Int32 ConnectionTimeout {get;}
    public String Database {get;}
    public ConnectionState State {get;}
    public DbProviderFactory ProviderFactory {get;}
    // Methods
    public DbTransaction BeginTransaction(
        IsolationLevel isolationLevel);
    public Void ChangeDatabase(String databaseName);
    public Void Close( );
    public DbCommand CreateCommand( );
    public Void Open( );
}
```

DbCommand

A DbCommand can execute a query against the store. In addition to, or as part of, a DbCommand that supports a storage-specific command syntax, the data provider may expose a canonical DbCommand that supports the ability to specify a command in a canonical form, with or without compensating for command operators not supported by the underlying store. An abbreviated example of a DbCommand is shown below.

```
// Core members of a DbCommand object
public abstract class DbCommand {
    // Properties
    public string CommandText {get;set;}
    public Int32 CommandTimeout {get;set;}
    public DbConnection Connection {get;set;}
    public DbParameterCollection Parameters {get;}
    public DbTransaction Transaction {get;set;}
    // Methods
    public void Cancel ( ) ;
    public Int32 ExecuteNonQuery ( ) ;
    public DbDataReader ExecuteReader ( );
    public Object ExecuteScalar ( ) ;
    public Void Prepare ( ) ;
}
```

ICommandTree

A Canonical form of a DbCommand may support the ability to set a command through a command tree representation, for example, by implementing a common interface.

```
public interface ICommandTree {
    public CommandTree CanonicalCommand {get;set;}
}
```

DbDataReader

Results may be returned as a DbDataReader. The following class definition shows the core members of an exemplary DbDataReader.

```
public abstract class DbDataReader : IDataRecord {
    // Properties
    public int Depth{get;}
    public Boolean IsClosed{get;}
    public int RecordsAffected{get;}
    // Methods
    public Void Close( );
    public Boolean NextResult( );
    public Boolean Read( );
}
```

The metadata for the result and field values for the current position may be obtained through the exemplary IDataRecord interface:

```
public interface IDataRecord {
    // Properties
    public int FieldCount {get;}
    public Object Item {get;}
    // Methods
    public Boolean GetBoolean (int ordinal);
    public Byte GetByte(int ordinal);
    public int GetBytes(int ordinal, int fieldOffset,
        Byte[ ] buffer, int bufferoffset, int length);
    public Char GetChar(int ordinal);
    public int GetChars(int ordinal, int fieldoffset,
        Char[ ] buffer, int bufferoffset, int length);
    public IDataReader GetData(int ordinal);
    public String GetDataTypeName(int ordinal);
    public DateTime GetDateTime(int ordinal);
    public Decimal GetDecimal(int ordinal);
    public Double GetDouble(int ordinal);
    public Type GetFieldType(int ordinal);
    public Single GetFloat(int ordinal);
    public Guid GetGuid(int ordinal);
```

-continued

```
    public int Getint(int ordinal);
    public int Getint(int ordinal);
    public int Getint(int ordinal);
    public String GetName(int ordinal);
    public int GetOrdinal(String name);
    public String GetString(int ordinal);
    public Object GetValue(int ordinal);
    public int GetValues(Object[ ] values);
    public Boolean IsDBNull(int ordinal);
    public DbDataRecord GetDataRecord(int ordinal);
}
```

DbDataReaders can be extended to expose sufficiently rich metadata for describing and accessing rich structural results, including complex-typed fields, polymorphic results, and nesting. Rich metadata describing the currently positioned datarecord may be exposed through a RecordInfo property, while the ability to set or get a complex-typed field may be exposed through a GetDataRecord( ) method, for example.

```
public interface IExtendedDataRecord {
    // Retrieve extended metadata for the current record
    public DataRecordInfo {get;}
    // Get a complex-valued field as a DataRecord
    public GetDataRecord(int ordinal);
}
```

In the case of polymorphism, the RecordInfo property may return different metadata for each record within the result, where each record derives from a common supertype whose metadata is described by the existing IDataRecord properties and is common across the result.

```
public class DataRecordInfo {
    public DataRecordInfo(IStructuralType metadata,
        IEnumerable<FieldMetadata> fieldInfo);
    // Type of the DataRecord
    public IStructuralType Metadata {get;}
    // Mapping of type members to fields of the DataRecord
    public ReadOnlyCollection<FieldMetadata> FieldInfo {get;}
}
public class FieldMetadata {
    public FieldMetadata(int Ordinal,
        IMemberMetadata FieldType);
    // Field Ordinal
    public int Ordinal {get;}
    // Type Metadata
    public IMemberMetadata FieldType {get;}
}
```

Where the currently positioned data record represents an entity with identity in the common data model, the DataRecordInfo can be exposed as a more specific EntityRecordInfo, which includes the identifier for the entity.

```
public class EntityRecordInfo : DataRecordInfo {
    public EntityRecordInfo (IEntityType metadata,
        IEnumerable<FieldMetadata> fieldInfo,
        EntityKey EntityKey);
    public new IEntityType Metadata {get;}
    public EntityKey EntityKey {get;}
}
```

DbDataAdapter

A DataAdapter may be provided that supports populating a cache from a store or updating a store based on changes made to cached data. The adapter may work with an individual or cache of objects that exposes original and current values through value-layer concepts (e.g. tuples). A DataAdapter may be extended to support working with a rich entity cache.

```
interface IEntityDataAdapter {
    public DbConnection Connection {get;}
    public bool AcceptChangesDuringUpdate {get;set;}
    public Int32 Update (IEntityCache cache) ;
}
```

Mapping Provider Classes

A common Mapping Provider can provide nested relational transformations and a richer conceptual schema based on client mapping information. The Mapping Provider can be exposed as a data provider.

MapConnection: DbConnection

A MapConnection can provide a mapped view over a DbConnection. The MapConnection can receive connection information, for example, through a named configuration section, a connection string, or an existing DbConnection with storage mapping. The MapConnection can then expose a schema, MapCommand, and results over that mapped view. For example:

```
// mapped connection
public class MapConnection : DbConnection {
    // constructors
    public MapConnection( );
    public MapConnection(string configSection);
    public MapConnection(DbConnection connection);
    public MapConnection(DbConnection connection,
        StorageMapping mapping);
    public MapCommand CreateCommand( );
    public StorageMapping StoreMapping {get;set;}
    public DbConnection ProviderConnection {get;set;}
}
```

MapCommand: DbCommand

The MapCommand can be a DbCommand against the (possibly mapped) schema. The syntax of the Mapping Provider's command text can be a canonical query language (e.g., entity query language). This object can also expose a static method for generating query trees from, for example, entity query language strings and can e.g., generate entity query language strings from query trees. Consider the following exemplary class definition:

```
// MapCommand
public class MapCommand : DbCommand, ICommandTree {
    // Constructors
    public MapCommand( );
    public MapCommand(MapConnection connection);
    // Set Command Tree
    public CommandTree CommandTree {get;set;}
}
```

Object Classes

ObjectCache

An ObjectCache can provide identity management and change tracking for objects. An ObjectContext may contain an ObjectCache. For example:

```
// object state/identity management, persistence
public class ObjectCache : IEntityCache
{
    public ObjectCache(ObjectMapping objectMapping);
    public IEnumerable<CacheEntry> GetCacheEntries(
        string entitySet, DataRowState state);
    public IEnumerable<CacheEntry> GetCacheEntries<T>(
        DataRowState state);
    public void Add(object cacheObject);
    public void Add(object cacheObject,
        IExtendedDataRecord origValues);
    public void Delete(object cacheObject);
    //string is the name of the role of the object
    //in the relationship
    public void AddRelationship (
        IRelationshipType relationshipType,
        KeyValuePair<string,EntityKey> entity1,
        KeyValuePair<string,EntityKey> entity2);
    public void DeleteRelationship (
        IRelationshipType relationshipType,
            KeyValuePair<string,EntityKey> entity1,
        KeyValuePair<string,EntityKey> entity2);
    public CacheEntry GetCacheEntry(object cacheObject);
    public CacheEntry GetCacheEntry(EntityKey key);
    public ObjectMapping ObjectMapping {get;}
}
```

Although the cache may contain references to objects, for example, the storage provider can work with the contents of the cache using value-layer entity abstractions. It is to be appreciated that caches containing other data abstractions, for example, XML could use the same value-layer abstractions to provide an interoperable way for storage providers to work with the contained data.

```
public interface IEntityCache {
    IEnumerable<CacheEntry> GetCacheEntries(DataRowState state);
}
```

An entry in the cache may be represented by, for example, a CacheEntry object that exposes original and current values at the value layer using tuples (e.g., DataRecords). The names of the fields, for example, are taken from the nested relational side of the object mapping. It is to be appreciated that there may be members associated with the cached object, such as identity or concurrency values, that are not exposed by the cache object but are available through the value-layer abstractions.

```
public class CacheEntry
{
    public object CacheObject { get; }
    public EntityKey EntityKey { get; }
    public IEntityCache Cache { get; }
    public DataRowState State { get; }
    public DbDataRecord OriginalValues { get; }
    public DbUpdatableDataRecord CurrentValues { get; }
    public IEnumerable<IMemberMetadata>
        GetModifiedProperties( );
    public void SetCurrentValue(MemberInfo member,
        object value);
    // Change the state of the object
    public void AcceptChanges( );
    public void RejectChanges( );
    public void Delete( );
}
```

ObjectContext

Object commands can optionally be executed within an ObjectContext to provide, for example, object identity, change tracking and the like. For instance:

```
// object mapping, identity management, persistence
public class ObjectContext {
    // Constructors
    public ObjectContext(string configSection);
    public ObjectContext(DbConnection connection,
        ObjectMapping objectMap);
    public DbConnection Connection {get;set;}
    public ObjectMapping ObjectMapping {get;set;}
    // Create a command at the object layer
    public ObjectCommand CreateCommand(String query);
    // Create a typed command at the object layer
    public ObjectCommand<T> CreateCommand<T>(String query);
    // Return a local collection for a particular type
    public EntitySet<T> GetCollection<T>( );
    public void SaveChanges( );
}
```

Local (cached) collections of objects can be exposed through an "EntitySet" object. The collection may represent a table in the store, a set of local results, or the members of a collection property, for example. This local collection may support, for example, object enumeration, local query, add/remove methods, and access to the query used to define the collection.

```
public class EntitySet<T> : ICollection<T>
{
    public EntitySet(IEnumerable<T> source, ObjectCache cache);
    public IEnumerable<T> Source {get;}
    public void Load( );
    public void Load<U>(Predicate<U> predicate) where U : T;
    public void Add(T object);
    public bool Remove(T object);
    public void Clear( );
    public bool Contains(T object);
    public int Count( ) {get;}
    public void CopyTo(T[] array, in ArrayIndex);
    public bool IsReadOnly {get;}
    public IEnumerator<T> GetPendingAdds( );
    public IEnumerator<T> GetPendingRemoves( );
}
```

ObjectCommand

ObjectCommand represents a query against objects. The ObjectCommand can be obtained from an ObjectContext or can be directly created given a DbConnection and object mapping.

```
public class ObjectCommand : DbCommand {
    public ObjectCommand(ObjectMapping objectMapping);
    public ObjectCommand(string commandText,
        DbConnection connection,
        ObjectMapping objectMapping);
    public ObjectMapping ObjectMapping {get;set;}
    public new ObjectParameterCollection Parameters {get;}
}
```

ObjectCommand<T>

ObjectCommand<T> can represent a typed query. ObjectCommand<T> can provide support for integration with query facilities built into the language. The ObjectCommand<T> can be obtained from the ObjectContext through a CreateCommand<T> method or can be directly created and given a DbConnection and object mapping. If the ObjectMapping is not specified, it can be obtained from the type of the ObjectCommand<T>. The ObjectCommand<T> can support methods for incrementally building a command.

```
// typed command builder
public class ObjectCommand<T> : IEnumerable<T> {
    // constructors
    public ObjectCommand( );
    public ObjectCommand(ObjectMapping objectMapping);
    public ObjectCommand(string commandText);
    public ObjectCommand(string commandText,
        DbConnection connection);
    public ObjectCommand(string commandText,
        ObjectMapping objectMapping);
    public ObjectCommand(string commandText,
        ObjectCache objectCache,
        LoadOptions loadOptions);
    public ObjectCommand(CommandTree commandTree,
        ObjectMapping objectMapping);
    public ObjectCommand(CommandTree commandTree,
        ObjectCache objectCache,
        LoadOptions loadOptions);
    public DbConnection Connection {get;}
    public ObjectParameterCollection Parameters {get;}
    public ObjectMapping ObjectMapping {get;}
    public QueryCommandTree CreateCommandTree( );
    // Execute Query
        public IEnumerable<T>Execute( );
    public IEnumerable<T> Execute(LoadOptions loadOptions);
    // GetEnumerator executes the query
    public IEnumerator<T> GetEnumerator( );
    // Methods for incrementally building a query
    public Query<T> Distinct( );
    public Query<T> Except(Query<T> query2);
    public Query<DataRecord> GroupBy(string command,
        params QueryParameter[ ] parameters);
    public Query<T> Intersect(Query<T> query2);
    public Query<TResultType> OfType<TResultType>( );
    public Query<T> OrderBy(string command,
        params QueryParameter[ ] parameters);
    public Query<DataRecord> Select(string command,
        params QueryParameter[ ] parameters);
    public Query<TResultType> SelectItem<TResultType>(
        string command, params QueryParameter[ ] parameters);
    public Query<T> Top(int count);
    public Query<T> Union(Query<T> query2);
    public Query<T> UnionAll(Query<T> query2);
    public Query<T> Where(string command,
        params QueryParameter[ ] parameters);
}
```

Object Materialization

Typed results may be returned as a IEnumerable<T> by calling GetEnumerator on the ObjectCommand<T>. An IEnumerable<T> may also be constructed over a properly formed existing result stream (e.g., DataReader) by providing the appropriate object mapping or cache. Similarly a single object may be obtained from a properly formed tuple (e.g., DataRecord), or object properties may be set or retrieved from an object. An ObjectMaterializer class can be constructed given the appropriate metadata for mapping between objects and the value layer, or can expose static methods for constructing objects and getting/setting properties through the value layer, as shown.

```
public static class ObjectMaterializer
{
    // Create a single object given a datarecord
    public static T CreateObject<T>(DbDataRecord record);
```

-continued

```
        public static T CreateObject<T>(DbDataRecord record,
            ObjectMapping mapping);
        public static T CreateObject<T>(DbDataRecord record,
            ObjectCache objectCache);
    // Create an IEnumerable<T> given a datareader
        public static IEnumerable<T> CreateObjects<T>(
            DbDataReader reader);
        public static IEnumerable<T> CreateObjects<T>(
            DbDataReader reader, ObjectMapping mapping);
        public static IEnumerable<T> CreateObjects<T>(
            DbDataReader reader, ObjectCache objectCache);
    // Get or Set properties
        public static V GetMember<T, V>(T dataObject,
            string memberName)
        public static V GetMember<T, V>(T dataObject,
            string memberName, ObjectMapping mapping);
        public static void SetMember<T, V>(T dataObject,
            string memberName, V value)
        public static void SetMember<T, V>(T dataObject,
            string memberName, V value, ObjectMapping mapping);
        public static void SetAllMembers<T>(T dataObject,
            DbDataRecord record);
        public static void SetAllMembers<T>(T dataObject,
            DbDataRecord record, ObjectMapping mapping);
    }
```

Figure 6:
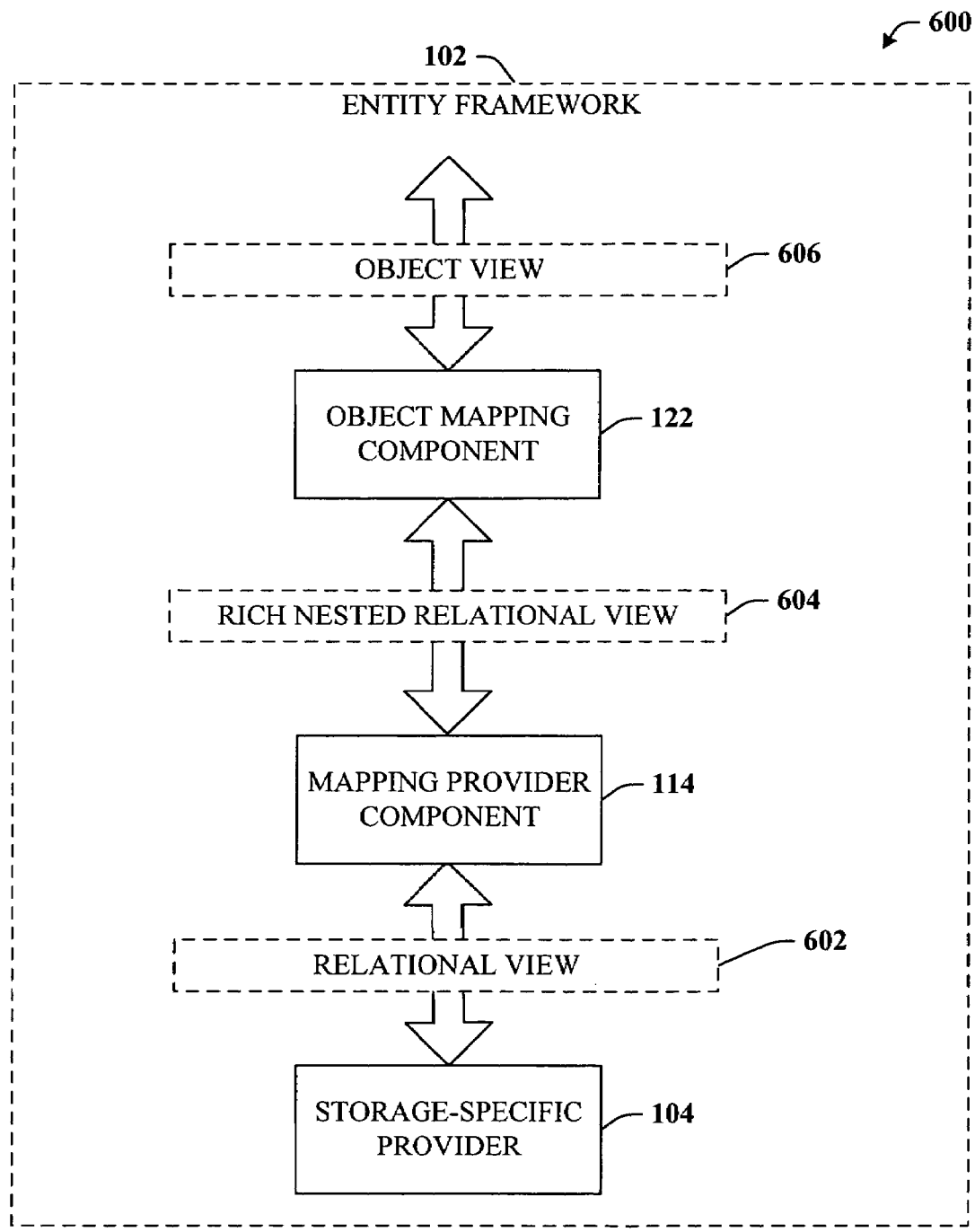
FIG. 6 illustrates an object-relational mapping solution that separates the input into two parts.

Turning to FIG. 6, a system 600 that facilitates an object-relational mapping solution by separating the object-relational map is illustrated. In general, the mapping provider component 114 transforms the relational view 602 exposed by the storage specific provider 104 to a rich nested relational view 604. This rich nested relational view 604 can then be transformed by the object mapping component 122 to expose a corresponding object view 606. Hence the entity framework 102 is able to decouple application logic and/or a data model from the relational view 602 that is exposed by the storage-specific provider 104.

The entity framework 102 can split the object-relational mapping into an Object/NestedRelational mapping component (e.g., the object mapping component 122) and a NestedRelational/Relational mapping component (e.g., the mapping provider component 114). In essence, mapping from objects to relational data is segmented into two parts. The first part (e.g., the NestedRelational/Relational) can encompass the mapping from the data store output (e.g., relational view 602) to a rich, nested relational model (e.g., rich nested relational view 604). Furthermore, because the object view 606 can be built upon a rich nested relational view 604 at the value layer, it follows that the object mapping can be very simple. For example, rich Object-Relational mapping can be provided by having a simple mapping between object view 606 and rich nested relational view 604 and a rich mapping rich nested relational view 604 and relational view 602. The combination of the object view 606 and corresponding rich nested relational view 604 can represent a common schema that can be coded against at either the value or the object layers.

Figure 7:
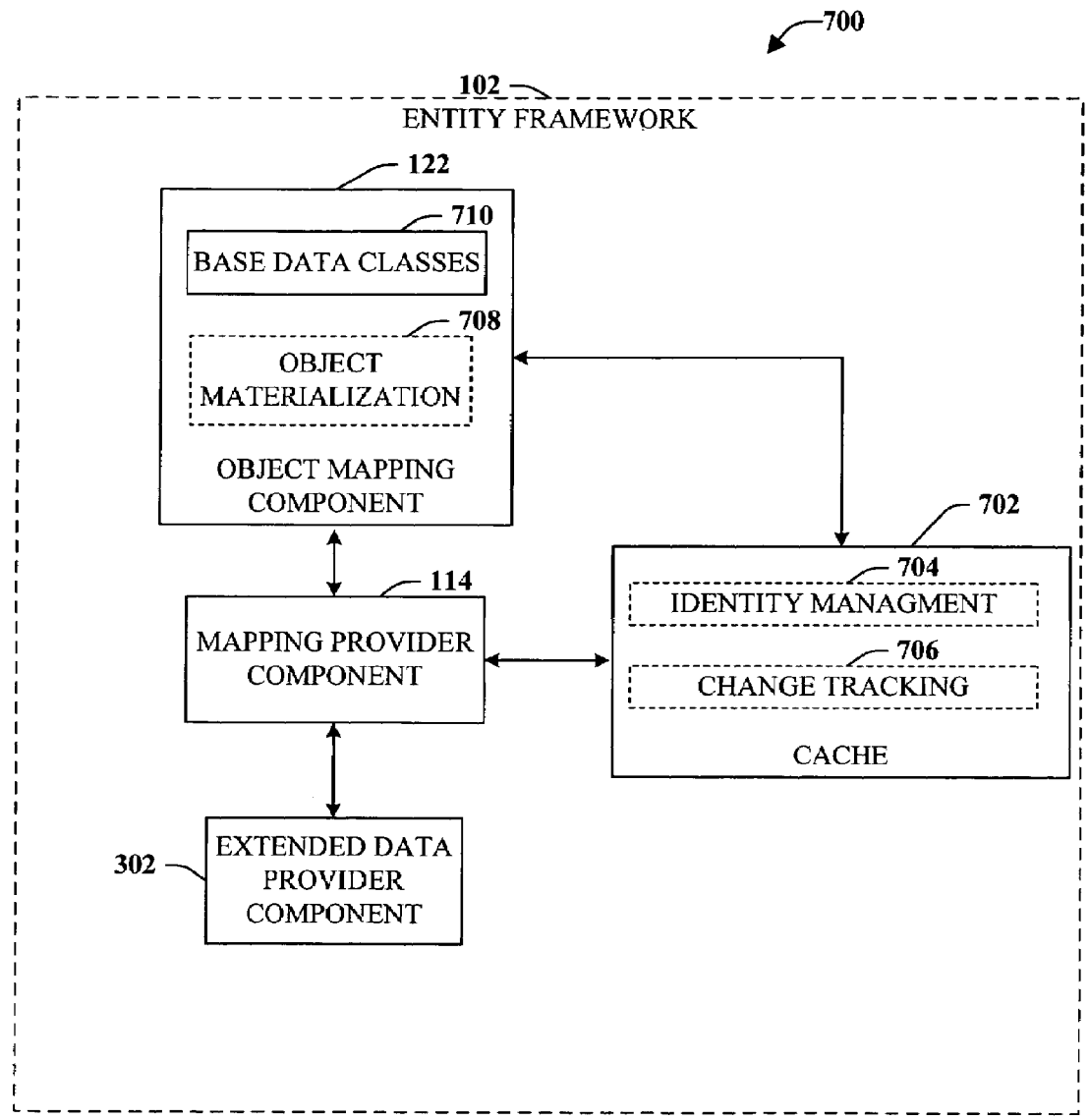
FIG. 7 illustrates a cache in conjunction with the extended data provider.

Turning now to FIG. 7 a system 700 that facilitates object-relational mapping is illustrated. The cache 702 can be used implicitly for object services supported by the entity framework 102 such as identity management 704, and/or change tracking 706. In addition, the cache 702 can be used explicitly such that developer can directly populate data in the cache 702, query data in the cache 702 and do other cache operations such as bind to it and so forth.

On top of not only the cache 702, but the extended data providers 302 and/or mapping provider component 114, object services can be supported, e.g., through mapping component 122. These can allow mapping of data records from the extended data providers 302 directly, or through mapping provider component 114, to .NET framework Common Language Runtime (CLR) classes. Such mapping can allow object materialization 708, e.g., results returned in response to commands can be materialized as data classes as well as building typed commands against a store schema (not shown). In addition base data classes 710 can be defined that can hook into the cache 702 for tracking changes 706 as well as other business logic and object service components. For example:

Data Classes/Relationship Classes

Data Classes (e.g., those classes that represent the data) may be written by hand or automatically generated from a Common Schema Definition Language (schema definition). Classes generated from the schema definition can make use of common base class elements that may be used in hand-written data classes, and that can generate partial classes that may be extended by the designer of the class.

Non-Prescriptive Classes Support

Object runtime classes (e.g., ObjectContext) need not make assumptions as to whether the data classes are generated, written by hand using common base classes, or are previously existing, unadorned non-prescriptive data classes. However, the object runtime can make use of prescriptive functionality within the data class in order to add functionality (such as lazy load or graph consistency) or performance (such as copy on write) for data classes that support such functionality.

Non-Prescriptive Collection Properties

Inline collections, entity associations, and compositions may all be mapped to non-prescriptive collections. Non-prescriptive collections must minimally support Add/Remove methods for population/synchronization.

When an object is materialized outside of a cache with an inline collection, entity association, and/or composition mapped to a non-prescriptive collection, the collection can be populated with the members of the collection, association, or composition. If the members of the collection, association, or composition are not present in the data record used to materialize the object, the collection can be left empty. Helper methods may be provided outside of the data classes in order to build a query to return the members of the specific collection.

When objects containing non-prescriptive collections that represent inline collections, entity associations, and/or compositions are materialized by a cache, the cache can maintain a related table for the collection members. The cache can initially merge any collection, association, or composed results from the data record into the related table and can then populate the non-prescriptive collection with the related, non-deleted members from the related table. If results are subsequently added to, or marked for deletion from the related table, the cache can add or remove the corresponding objects from the non-prescriptive collection as appropriate. However, the application must, in some manner, synchronize the parent object with the cache in order to have objects added to or removed from the non-prescriptive collection reflected in the related table.

Non-Prescriptive Reference Properties

References to inline types or entities may be mapped to standard CLR reference properties in data classes. Upon materialization of inline types, or entities outside of a cache, if the data record contains values for the referenced type or entities, the appropriate class can be materialized and the CLR reference can be set to the materialized class.

Upon materialization of referenced entities by the cache, the cache can maintain the referenced entity in a separate table. As well, the cache can merge any values for the referenced entity to the separate table, and can then set the CLR reference to the merged object.

Typed Object Context

Given a schema, a typed object context that can provide strongly typed access to the EntitySets (e.g., tables) defined within the EntityContainer (e.g., database or schema) can be generated. For example, given the following schema definition fragment:

```
<EntityContainerType Name="SalesData"/>
    <Property Name="Customers" Type="EntitySet(Customers)"/>
    <Property Name="Orders" Type="EntitySet(Orders)"/>
</EntityContainerType>
```

The class generator can generate a partial class with the following members:

```
public partial class SalesData : ObjectContext {
    public EntitySet<T> Customers {get;}
    public EntitySet<T> Orders {get;}
}
```

WinFS ItemContext

A typed ObjectContext, e.g., ItemContext, can be generated for the WinFS-brand OS. WinFS-brand Data can contain WinFS-brand-specific functionality that can be employed in accordance with the claimed subject matter. As well, it is to be appreciated that other aspects can employ N-Tier Scenarios, Client Tier w/Explicit Sync to Local Store, Middle-tier SOA, and the like without departing from the scope and spirit of the claimed subject matter.

Figure 8:
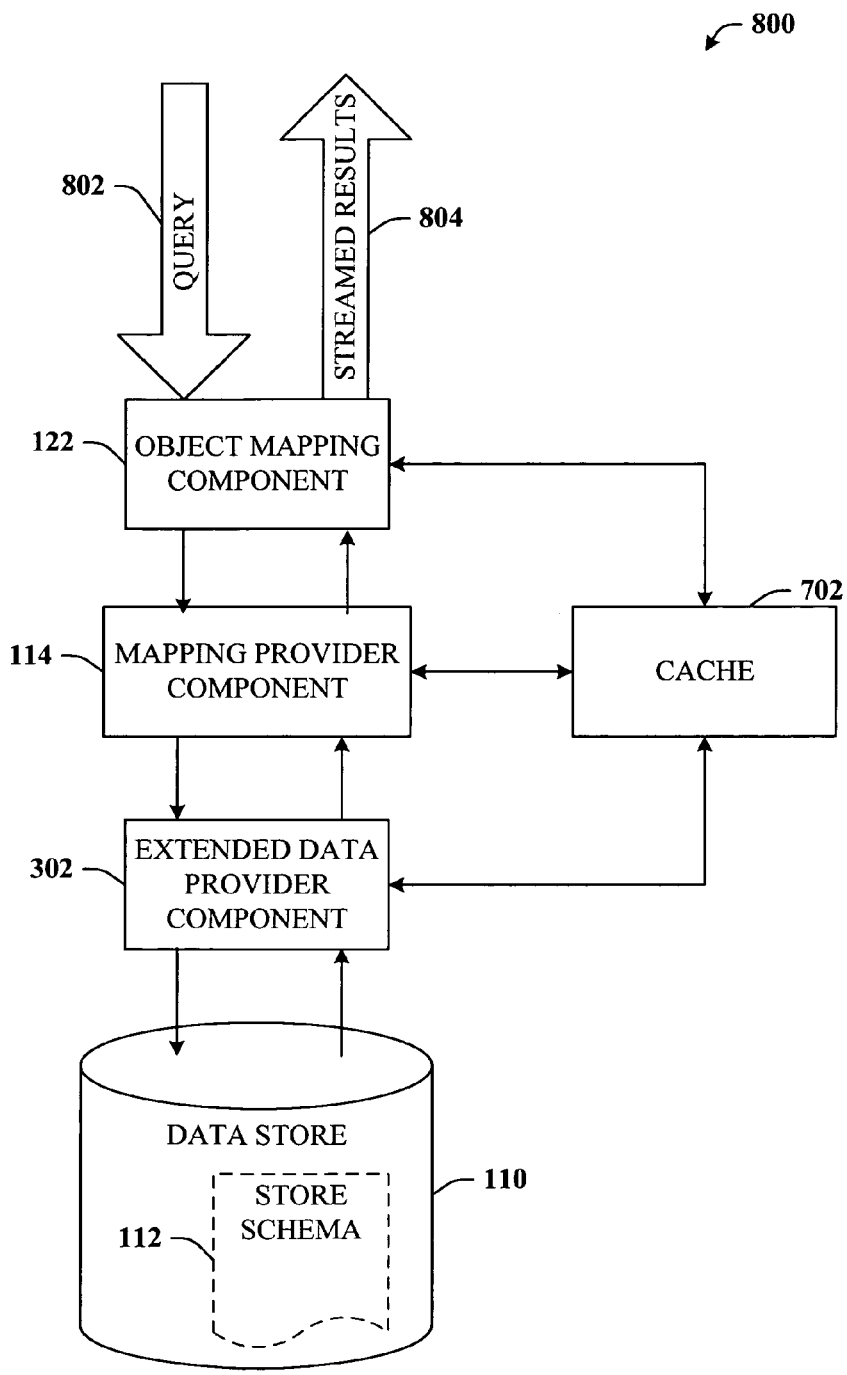
FIG. 8 illustrates the mapping provider that can receive a query and stream the results to the query.

Turning now to FIG. 8, a system 800 that facilitates streamed results from a data store is depicted. The object mapping component 122 can receive a query 802. This query 802 is passed through the mapping provider component 114 to the extended data provider component 302 and ultimately to the data store 110. Rather than inserting/merging results from the query into the cache 702, the object mapping component 122 can provide a streamed result 804 of data classes directly from a data store 110 by way of the extended data provider component 302 and mapping provider 114. While merging results with a cache 702 can provide a consistent view of the object in case some objects have changed in memory, typically, the vast majority of queries (e.g., query 802) are read-only. Therefore streaming the result 804 to the query 802 does not necessitate the overhead of maintaining an object in memory. However, as described above, it is to be appreciated that the claimed subject matter can allow for caching of objects, identity management, and change tracking, for example, when the cache 702 is explicitly designated to be used.

It is to be further appreciated that, by exposing the cache 702 through public interfaces that work with object mapping component 122, mapping provider component 114, and/or extended data provider 302, the application can control the level of caching desired. For example, the application can use the same cache 702 across multiple query 802 requests in order to track changes and manage identity across multiple results. Alternatively, the application can use a separate instance of cache 702 for each query 802 in order to manage identity and track changes within a single result. In another alternative, the application can use a separate instance of a cache 702 for each subtree of a result in order to manage identity within that subtree. In yet another alternative, the application may chose to put only individual data objects from within a result in order to manage identity and track changes only for those individual objects. Alternatively still, an application may choose not to use the cache at all in order to have efficient, read-only, streamed access without change tracking or identity management, for example.

The following usage scenarios describe different targets for the object mapping component 122 in relation to the above:

Efficient Streaming of Objects

A common access pattern that deserves special consideration is the streaming scenario. The streaming scenario can allow large amounts of data to be processed without first (or ever) loading into a cache. The ultimate example of streaming is a continuous data feed. The fact that results can be exposed as objects rather than value records should not change the need to support this pattern. Consider the following code example:

```
// Write out all customers and their orders
foreach(Customer c in Customers) {
    Console.WriteLine("Customer Name= {0}",c.LastName);
    foreach(Order o in c.Orders) {
        Console.WriteLine("OrderID = {0} Amount={1}",o.oid,
    o.Amount);
    }
}
```

In this case, each value can be read only once, and orders can be consumed in order for each customer. Once the application reads the next customer, orders for the previous customer need not be available. In order to optimize this streaming pattern, the consumer of the stream may be required to adhere to certain restrictions in how the data is accessed. In particular, data can generally only be read sequentially. Once the next customer is read, all knowledge of the previous customer, including the ability to update it or enumerate its orders, may no longer be available. Fortunately, these potential restrictions exactly match the common coding pattern of nested enumerators shown above.

Because no cache is involved, instance identity need not be maintained. For example, multiple objects may be returned that represent the same entity in the database.

Figure 9:
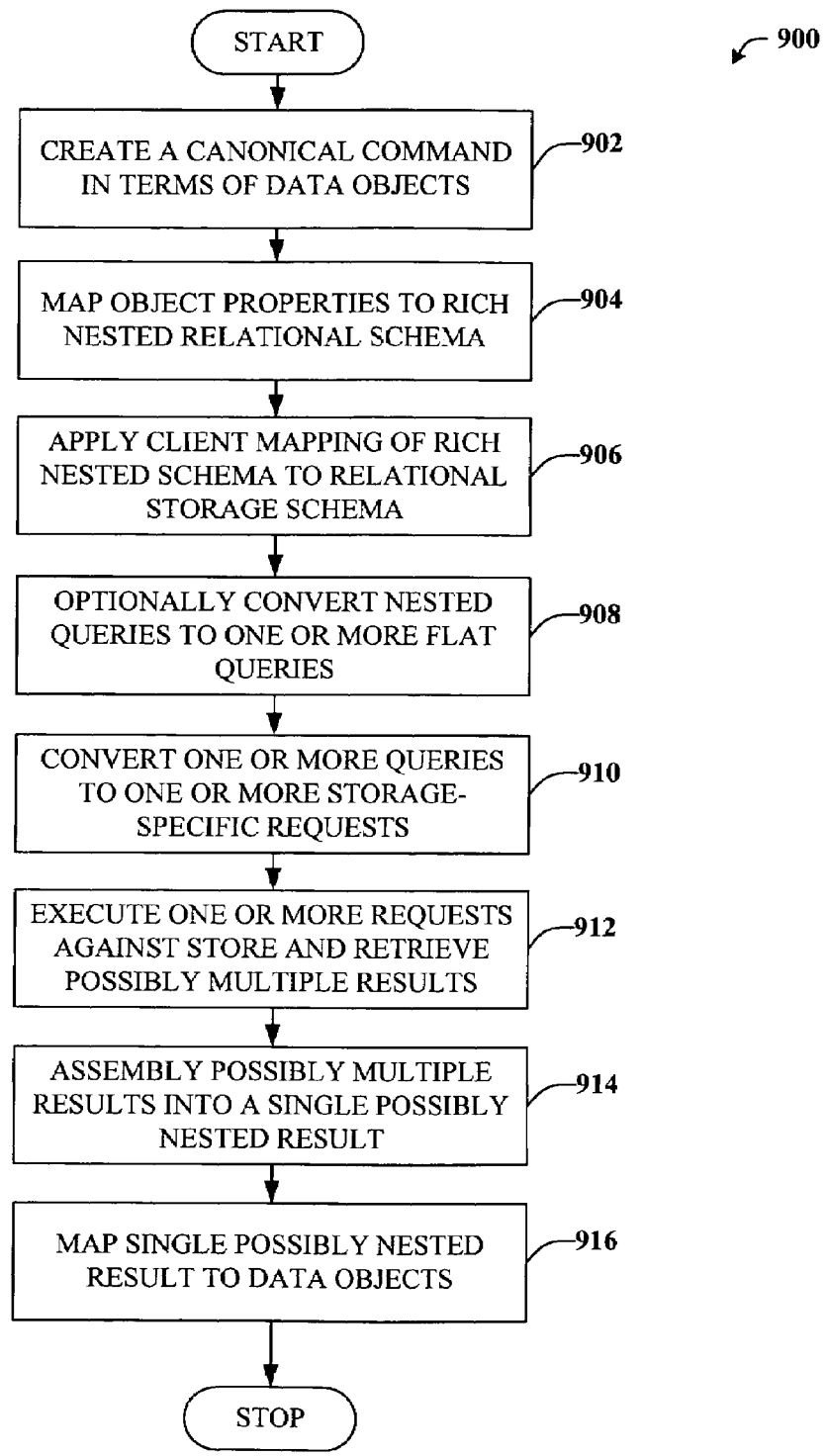
FIG. 9 illustrates an exemplary flow chart of procedures that facilitates an object-relational mapping solution.

FIG. 9 illustrates methodology 900 in accordance with the claimed subject matter. While, for purposes of simplicity of explanation, the methodology is shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 9, an exemplary computer implemented methodology 900 for incrementally extending a data provider is illustrated. At 902, a canonical command can be created in terms of data objects. As detailed supra, a canonical command can be defined as a command that can express a command (e.g., a query) across a variety of data providers and a canonical command can be represented as a canonical command tree or canonical text syntax, for example. At 904, the canonical command in terms of data objects can be translated to a canonical command against a rich nested relational schema, for example, by mapping object properties to constructs within the relational schema. This nested relational data model can be defined at the value layer and can utilize concepts not conventionally employed in relational databases such as nesting, inheritance hierarchy, complex types and rich relationships (e.g., association or composition) and the like. The nested relational data model can be exposed as a data provider (e.g., it has a connection, a command, a result object and a change processing object) to facilitate a rich object-relational solution that can work with data at both the value layer and the object layer.

At 906, the canonical command in terms of a rich nested relational schema can be translated (e.g., by a mapping data provider) into a canonical command against a relational storage schema, for example, by apply client-side views to the command. At 908, nested queries within the command may be broken into one or more flat queries, for example, to work against stores that do not support nesting operations.

At 910, one or more queries can be converted to store-specific requests for data, for example, native SQL in a format compatible with the database schema. At 912, one or more requests for data are executed against the store, yielding one or more results (e.g., relational results).

At 914, possibly multiple results can be assembled into a single result, and the result can potentially be a nested result. At 916, a single possibly nested result can be mapped to objects. The single possibly nested result might have been transmitted, for example, to an object materialization component from a data store, e.g., in response to a command such as the canonical command 902.

Figure 10:
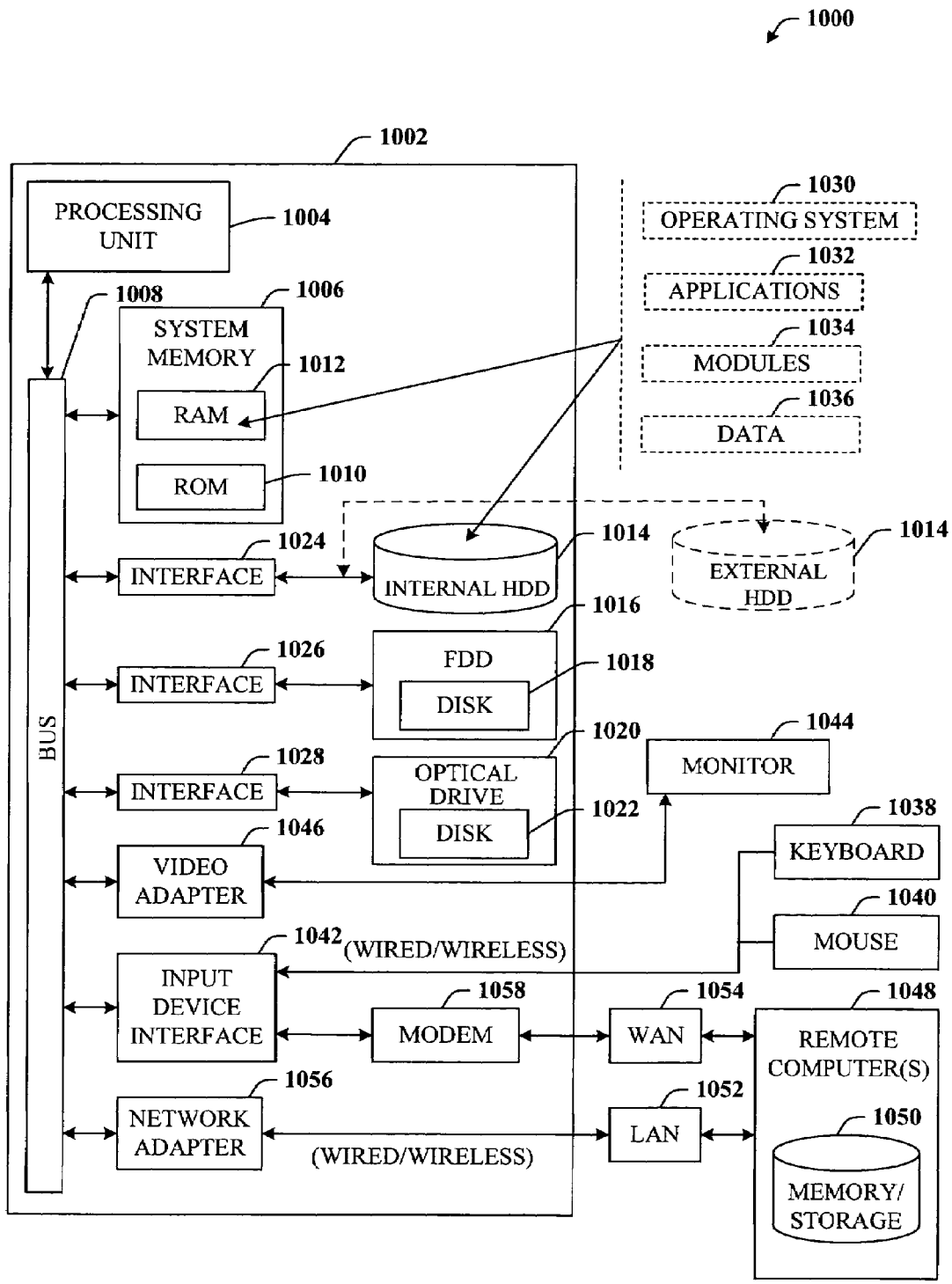
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. For example, the computer implemented system that provides an incremental approach to an Object-Relational mapping solution by extending a data provider can be implemented via the system 1000. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
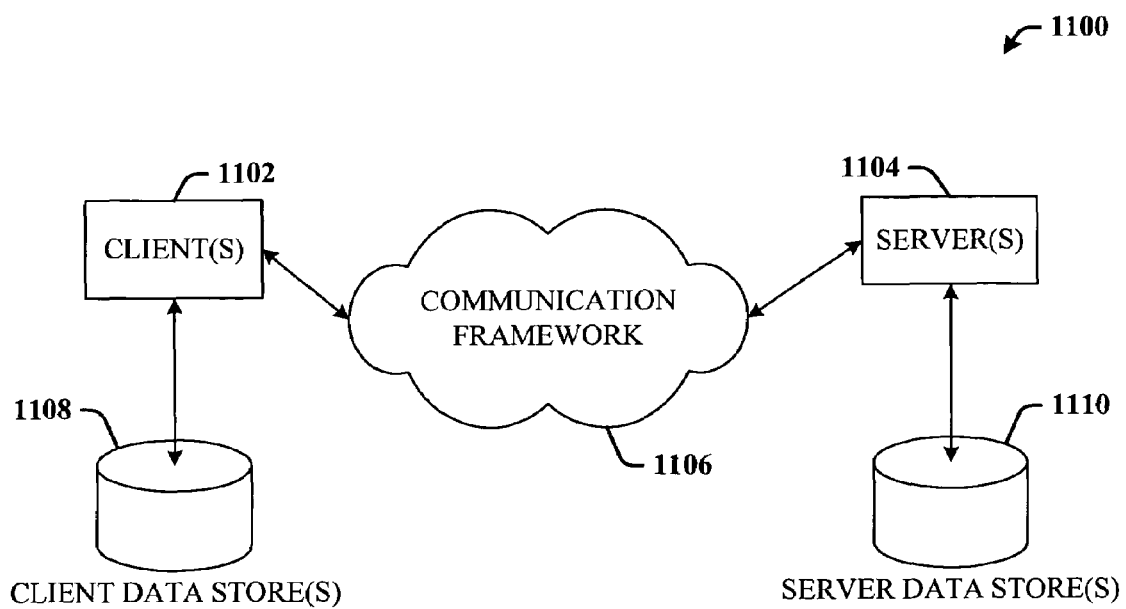
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "include" or "includes" are used in either the detailed description or the claims, such term is intended to be inclusive in a manner similar to the term "comprising" as "comprising" is interpreted when employed as a transitional word in a claim.

What is claimed is:

1. A system that facilitates an incremental approach to object-relational mapping by providing functionality, that is typically found in an object layer, on top of an existing value layer API, the system comprising the following components:
   a storage-specific provider component that exposes an API at a value layer of the system for accessing data within a data store, the API conforming with a common data model such that requests made through the API include a connection, a command, and a result object, wherein data returned by the storage-specific provider component is formatted as flat relational data;
   a mapping provider component that maps the data returned by the storage-specific provider component to a rich relational schema, the rich relational schema defining a format for the data that includes hierarchical and inheritance information, but without materializing the data as an object, the mapping provider component further exposing a rich schema API at the value layer through which the data formatted according to the rich relational schema is retrieved, the rich schema API conforming with the common data model such that requests made through the rich schema API include a connection, a command, and a result object such that requests for data may be made through the API exposed by the storage-specific provider component or the rich schema API exposed by the mapping provider component using the same API calls at the value layer;
   an object layer object mapping component that maps data returned by the mapping provider component to an object schema in accordance with the common data model, wherein a processor operatively coupled to memory implements the storage-specific provider component, the mapping component and the object layer object mapping component; and
   a value layer services component that operates in terms of the common data model, wherein the value layer services comprise at least one of returning results with inheritance, returning associations within results, or returning compositions within results without materializing a class representing the value, and wherein the value layer services component includes a common component that compensates for a command operator not supported by the data store.

2. The system of claim 1, the common data model includes an entity, the entity is at least one of an entity with strong identity, an entity with inheritance, an entity with complex types, and an entity with relationships.

3. The system of claim 1, the command operator includes a representation of nested results.

4. The system of claim 1, the services component includes a cache.

5. The system of claim 4, the cache is employed for at least one of identity management and change tracking.

6. The system of claim 1, the object services includes at least one of a typed query, or data aggregation.

7. The system of claim 1, the object layer object mapping component exposes an object API conforming with the common data model such that requests made through the object API include a connection, a command, and a result object such that requests for data may be made through the API exposed by the storage-specific provider component or the object API using the same API calls at the value layer.

8. The system of claim 1, further including a common metadata service component that describes the common data model and supports services that require metadata.

9. The system of claim 1, the storage-specific provider component is extended to support a common command representation.

10. The system of claim 1, the storage-specific provider component is extended to compensate for a command operator not supported by the data store.

11. The system of claim 10, the command operator includes a representation of nested results.

12. The system of claim 1, the object layer object mapping component receives mapping information by reflecting on properties of the type being materialized.

13. The system of claim 1, the mapping provider component gets mapping information from an object mapping loaded from one of a file or a data store.

14. A computer storage medium having stored thereon the following computer executable components:
   a storage-specific provider component that exposes an API at a value layer of a computer system for accessing data within a data store, the API conforming with a common data model such that requests made through the API include a connection, a command, and a result object, wherein data returned by the storage-specific provider component is formatted as flat relational data;
   a mapping provider component that maps the data returned by the storage-specific provider component to a rich relational schema, the rich relational schema defining a format for the data that includes hierarchical and inheritance information, but without materializing the data as an object, the mapping provider component further exposing a rich schema API at the value layer through which the data formatted according to the rich relational schema is retrieved, the rich schema API conforming with the common data model such that requests made through the rich schema API include a connection, a command, and a result object such that requests for data may be made through the API exposed by the storage-specific provider component or the rich schema API exposed by the mapping provider component using the same API calls at the value layer;
   an object layer object mapping component that maps data returned by the mapping provider component to an object schema in accordance with the common data model, wherein a processor operatively coupled to memory implements the storage-specific provider component, the mapping component and the object layer object mapping component; and a value layer services component that operates in terms of the common data model, wherein the value layer services comprise at least one of returning results with inheritance, returning associations within results, or returning compositions within results without materializing a class representing the value, and wherein the value layer services component includes a common component that compensates for a command operator not supported by the data store.

* * * * *